(12) United States Patent
Tanaka et al.

(10) Patent No.: US 7,493,238 B2
(45) Date of Patent: Feb. 17, 2009

(54) ABNORMAL NOISE CORRECTION VERIFICATION APPARATUS

(75) Inventors: Tsutomu Tanaka, Aikawa-machi (JP); Junichi Kawano, Atsugi (JP); Toshiaki Yoshida, Yamato (JP); Junichi Amakatsu, Miura-gun (JP)

(73) Assignee: Nissan Motor Co., Ltd., Yokohama (JP)

( * ) Notice: Subject to any disclaimer, the term of this patent is extended or adjusted under 35 U.S.C. 154(b) by 56 days.

(21) Appl. No.: 11/655,065

(22) Filed: Jan. 19, 2007

(65) Prior Publication Data

US 2007/0185664 A1 Aug. 9, 2007

(30) Foreign Application Priority Data

Jan. 30, 2006 (JP) .............................. 2006-021443
Nov. 1, 2006 (JP) .............................. 2006-298185

(51) Int. Cl.
*H03F 1/26* (2006.01)
*G06F 15/00* (2006.01)
(52) U.S. Cl. ........................... 702/191; 702/56; 702/183
(58) Field of Classification Search ............. 702/56–59, 702/183–185, 191; 701/29, 36, 38, 200; 701/207, 301; 303/191
See application file for complete search history.

(56) References Cited

U.S. PATENT DOCUMENTS 7,184,930 B2 * 2/2007 Miyasaka et al. ........... 702/183

2004/0222696 A1* 11/2004 Kamiya et al. .............. 303/191
2007/0032968 A1* 2/2007 Nakamura .................... 702/56

FOREIGN PATENT DOCUMENTS

JP H05-312635 11/1993
JP H10-019660 1/1998

* cited by examiner

*Primary Examiner*—John H Le
(74) *Attorney, Agent, or Firm*—Global IP Counselors

(57) ABSTRACT

An abnormal noise correction verification apparatus is provided that can easily verify the effectiveness a corrective action with respect to an abnormal noise being generated. The apparatus has at least one vibration sensor, which detect vibrations of the vehicle. The apparatus extracts a signal in a specific frequency band for the vibrations detected from the vibration sensor. The apparatus stores a pre-corrective action signal extracted from the vibration sensor, which is from before eliminating a cause of abnormal noise, and a post-corrective action signal extracted from the vibration sensor, which is from after eliminating the cause of abnormal noise. Both pre-corrective action signal and the post-corrective action signal were detected under identical travel conditions by the vibration sensor. The apparatus then synchronizes and separately outputs the pre-corrective action signal and the post-corrective action signal for comparison.

18 Claims, 15 Drawing Sheets

ABNORMAL NOISE CORRECTION VERIFICATION APPARATUS

CROSS-REFERENCE TO RELATED APPLICATIONS

This application claims priority to Japanese Patent Application No. 2006-021443 filed on Jan. 30, 2006. The entire disclosure of Japanese Patent Application No. 2006-021443 is hereby incorporated herein by reference.

BACKGROUND OF THE INVENTION

1. Field of the Invention

The present invention generally relates to an abnormal noise correction verification apparatus as well as an abnormal noise correction verifying method. More specifically, the present invention relates to an abnormal noise correction verification apparatus and an abnormal noise correction verifying method that compare vibrations generated by a vehicle before and after eliminating the causes of abnormal noise in order to verify whether the action taken to correct the abnormal noise has been effective.

2. Background Information

If, for example, abnormal vibrations are generated by an inspection target object, such as a constituent part of a vehicle, then an individual usually places his or her ear close to the part that is thought to be generating the abnormal vibrations, listens, and presumes that the location where the vibration noise sounds the loudest is the abnormal vibration source, i.e., the location where a problem is occurring (herein referred to as a "problem location").

One example of device that detects abnormal vibrations is disclosed in Japanese Published Unexamined Patent Application No. H05-312635. In this publication, several vibration sensors are used to detect vibrations that are generated by an inspection target object. The output signals of the vibration sensors pass through a two-channel amplification circuit, and an operator uses stereo type headphones to listen to those detected signals. Thus, the operator is able to detect whether a problem location exists in the inspection target object.

SUMMARY OF THE INVENTION

It has been discovered that with the related art mentioned above, after corrective action (such as repair work) is taken at a location that is presumed to be the problem location, an operator must listen for vibration noise once again to determine the degree to which the corrective action was effective. This determination is dependent upon the operator's intuition and experience. Consequently, there is not only a problem in that corrective action to address the causes of abnormal noise takes time, but there is also a problem in that it requires operator expertise to determine the degree to which the corrective action was effective.

The present invention was created to solve the abovementioned problems. One object of the present invention is to provide an abnormal noise correction verification apparatus and an abnormal noise correction verifying method that can easily verify the degree to which corrective action was effective after taking such corrective action at the problem location.

The present invention is an abnormal noise correction verification apparatus that verifies whether corrective action taken for abnormal noise was effective by comparing the vibrations of a vehicle before and after eliminating a cause of abnormal noise. In accordance with one aspect of the present invention, an abnormal noise correction verification apparatus is provided that basically comprises a vibration sensor, a signal extracting component, a signal storing component and an outputting component. The vibration sensor is configured to detect vibrations of a vehicle. The signal extracting component is configured to extract a signal in a specific frequency band of the vibrations detected from the vibration sensor. The signal storing component configured to store the signal extracted from the vibration sensor. The outputting component configured to synchronize and separately output a pre-corrective action signal from the signal storing component, which is from before eliminating a cause of abnormal noise, and a post-corrective action signal, which is from after eliminating the cause of abnormal noise, in which both signals were detected under identical travel conditions by the vibration sensor.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
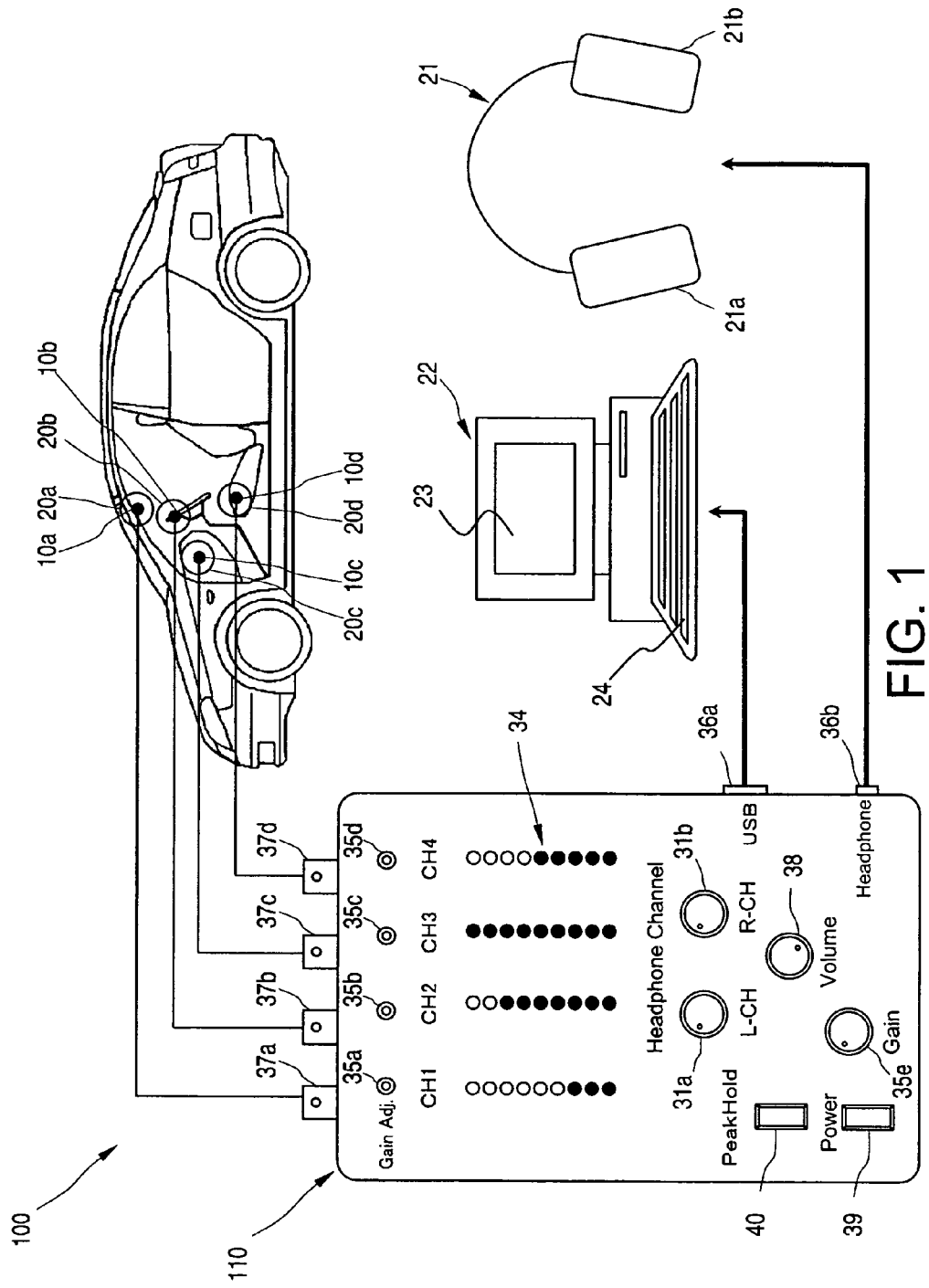
FIG. 1 is a diagrammatic illustration of an abnormal noise correction verification apparatus in accordance with a first embodiment of the present invention, which illustrates searching for the locations in a vehicle in which the abnormal vibrations are being generated.

Before describing the embodiments of the present invention in detail, an overview of an abnormal noise investigation will be given first in order to facilitate understanding of an abnormal noise correction verification apparatus 100 and method according to a first embodiment of the present invention. FIG. 1 serves to explain the general constitution of the abnormal noise correction verification apparatus 100 according to the present invention, and illustrates usage conditions for searching for a part where abnormal vibrations of a vehicle are generated. As shown in FIG. 1, the abnormal noise correction verification apparatus 100 basically includes a main abnormal noise investigation unit 110, a plurality of vibration sensors 10a to 10d, a personal computer 22, and a pair of headphones 21.

The main abnormal noise investigation unit 110 has a plurality of sensor connection terminals 37a to 37d and a plurality of gain adjustment knobs 35a to 35e. The vibration sensors 10a to 10d are connected to the sensor connection terminals 37a to 37d. The gain adjustment knobs 35a to 35d separately adjust the input sensitivity of each of the vibration sensors 10a to 10d. The gain adjustment knob 35e adjusts the overall input sensitivity of the vibration sensors 10a to 10d. The gain adjustment knobs 35a to 35d are used to compensate for variations among the individual sensitivities of the vibration sensors 10a to 10d so that each sensor outputs a signal of a fixed magnitude when a fixed vibration is detected. It is preferable to compensate for variations among the individual sensitivities before using the main abnormal noise investigation unit 110. The sensitivities of all of the vibration sensors 10a to 10d can be collectively adjusted by the gain adjustment knob 35e. Furthermore, a first channel 1 (CH1) is formed by the vibration sensor 10a and the gain adjustment knob 35a, a second channel 2 (CH2) is formed by the vibration sensor 10b and the gain adjustment knob 35b, a third channel 3 (CH3) is formed by the vibration sensor 10c and the gain adjustment knob 35c, and a fourth channel 4 (CH4) is formed by the vibration sensor 10d and the gain adjustment knob 35d.

In addition, the main abnormal noise investigation unit 110 further comprises a plurality of vibration level peak meters 34 (i.e., one for each channel CH1 to CH4) and a peak hold switch 40. The peak hold switch 40 turns the peak hold function on and off. Furthermore, the main abnormal noise investigation unit 110 also includes a USB terminal 36a where the personal computer 22 is connected. The personal computer 22 stores the inspection target object vibrations detected by the vibration sensors 10a to 10d that are inputted to the personal computer 22 via the USB terminal 36a.

Furthermore, the main abnormal noise investigation unit 110 comprises a headphones output terminal 36b where the headphones 21 are connected. Thus, the sound of the inspection target object vibrations detected by the vibration sensors 10a to 10d can be heard using the headphones 21. The main abnormal noise investigation unit 110 also includes a left ear channel selection switch 31a (L-CH) and a right ear channel selection switch 31b (R-CH), whereby the channels can be separately selected for the right and left speakers of the headphones 21. A volume adjustment knob 38 is also provided on the main abnormal noise investigation unit 110 to enables simultaneous adjustment of the volume for the left and right speakers of the headphones 21. A power supply switch 39 turns the power supply of the main abnormal noise investigation unit 110 on and off.

When searching for a part where abnormal vibrations of a vehicle are generated, the abnormal noise correction verification apparatus 100 is used with the following procedure. Here, the following explanation illustrates a case wherein there was a complaint to the effect that abnormal vibration noise (e.g., chatter) can be heard in the vicinity of the steering wheel.

Given that abnormal vibration noise is being generated in the vicinity of the steering wheel, it is presumed that a trim part (inspection target object) that is installed in the vicinity of the steering wheel is usually the noise source. Accordingly, the vibration sensors 10a to 10d are attached to the problem location that is presumed to be the noise source. Specifically, the vibration sensor 10a is attached to a front pillar 20a, the vibration sensor 10b is attached to a steering wheel 20b, the vibration sensor 10c is attached to a glove compartment 20c, and the vibration sensor 10d is attached to a front seat 20d. Furthermore, each of the vibration sensors 10a to 10d is attached by using a fixing or fastening element, such as a magnet or double-sided tape.

Furthermore, the search for abnormal vibrations is started by pressing the power supply switch 39 and the peak hold switch 40. When the power supply switch 39 and the peak hold switch 40 are turned on, vibrations that are detected by the vibration sensors 10a to 10d are inputted to the main abnormal noise investigation unit 110 as signals that correspond to the magnitudes of those vibrations. The vibration level peak meters 34 for each of the vibration sensors 10a to 10d, hold the peaks of the vibration levels, which are generated in a time series, of the inputted vibrations.

The inputted signals are output to the personal computer 22 via the USB terminal 36a and simultaneously to the headphones 21 via the headphones output terminal 36b. The signals outputted from the main abnormal noise investigation unit 110 are stored by the personal computer 22. Then, those stored signals are processed and then displayed on a monitor 23. In addition, the signals output from the main abnormal noise investigation unit 110 are output as sound waves via the left and right speakers of the headphones 21. Furthermore, the volume outputted from the headphones 21 is adjusted by operating the volume adjustment knob 38.

The part where the abnormal vibrations of the vehicle are generated, i.e., the problem location, is determined by a person listening to the sound waves outputted from a left ear headphone 21a (L-CH) and a right ear headphone 21b (R-CH). For example, if the channel selection switch 31a (L-CH) is set to channel 1 (CH1) and the channel selection switch 31b (R-CH) is set to channel 2 (CH2), then it is possible to listen to the vibration noise generated by the front pillar 20a from the right ear headphone 21b and the vibration noise generated by the steering wheel 20b from the left ear headphone 21a simultaneously.

In addition, it is possible for a person to search for the problem location by listening to the sound waves that are output from the left ear headphone 21a (L-CH) and the right ear headphone 21b (R-CH) as mentioned above, and observing the peaks of the vibration levels, which are generated in a time series, that are displayed via the vibration level meters 34. Referring to FIG. 1, it can be seen that the vibration level meter 34 that displays the highest level is the third channel 3 (CH3). As a result, it is possible to determine just by looking at this display that the vibration sensor 10c that the third channel 3 corresponds to the problem location, i.e., the glove compartment 20c is the problem location. Furthermore, if the personal computer 22 is used, then it is possible, for example, to store the signals that are detected by the vibration sensors 10a to 10d, process the stored signals, and then display the processed signals. For example, as shown in FIG. 4, the vibration waveforms and the peaks of the vibration levels can be displayed on the monitor 23.

Thus, by selecting two different, arbitrary signals from the signals extracted from the vibration sensors 10a to 10d, a person can auditorily determine the problem location by listening to and simultaneously comparing those signals, and can also visually determine the problem location by observing the peaks of the vibration levels that are displayed via the vibration level meters 34.

Figure 2:
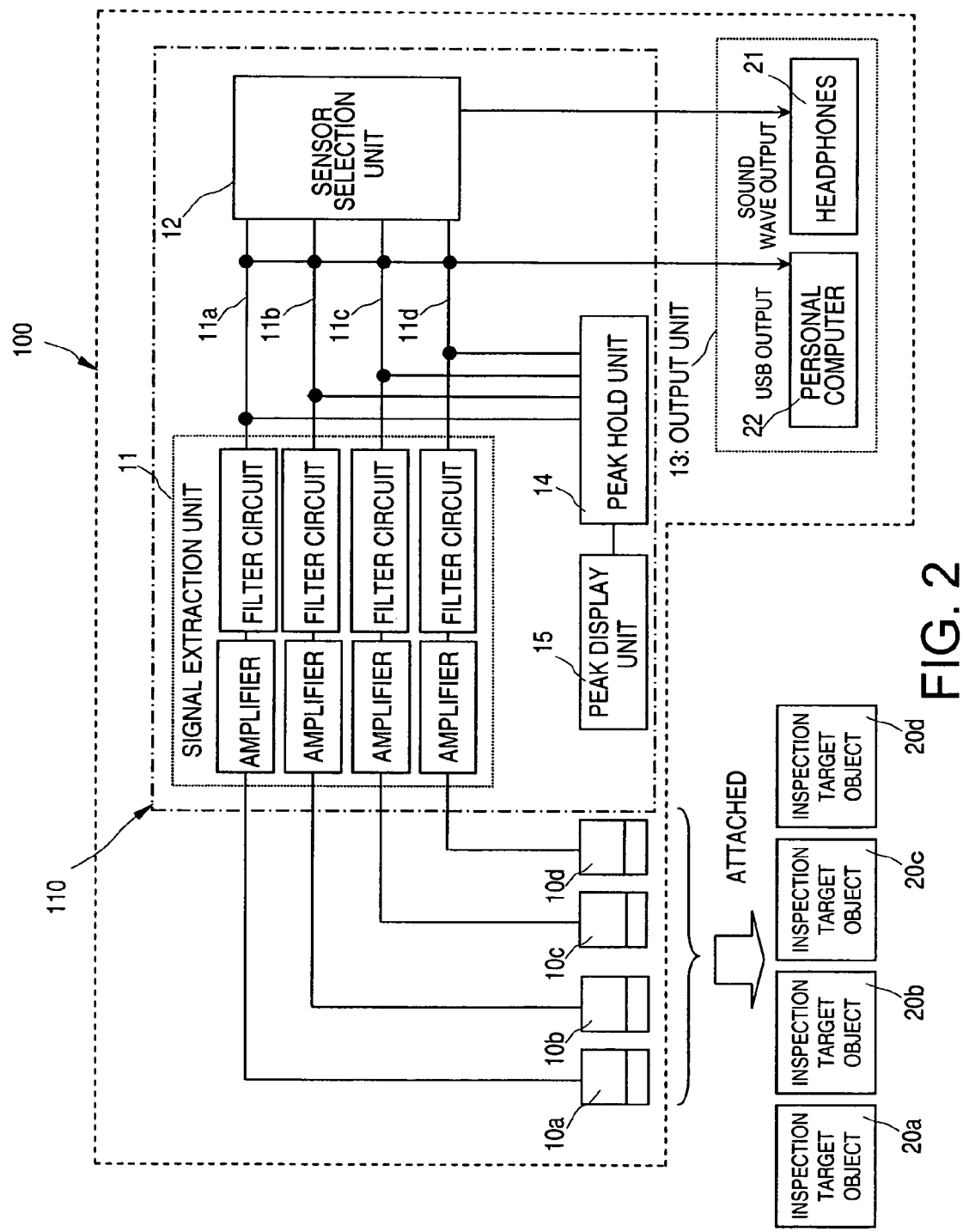
FIG. 2 is a schematic block diagram of the abnormal noise correction verification apparatus in accordance with a first embodiment of the present invention.
Figure 3:
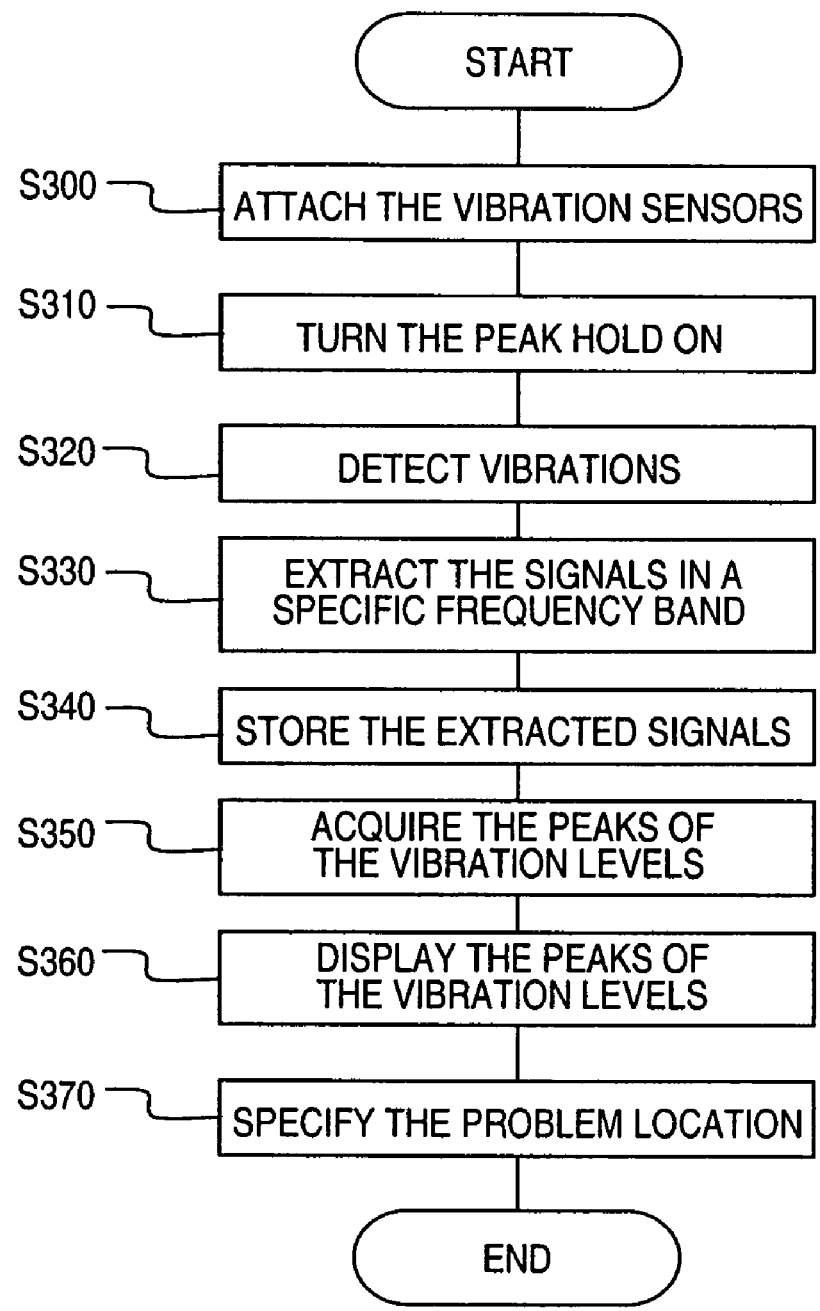
FIG. 3 is an operational flow chart of the operations executed by the abnormal noise correction verification apparatus in accordance with the first embodiment of the present invention.
Figure 4:
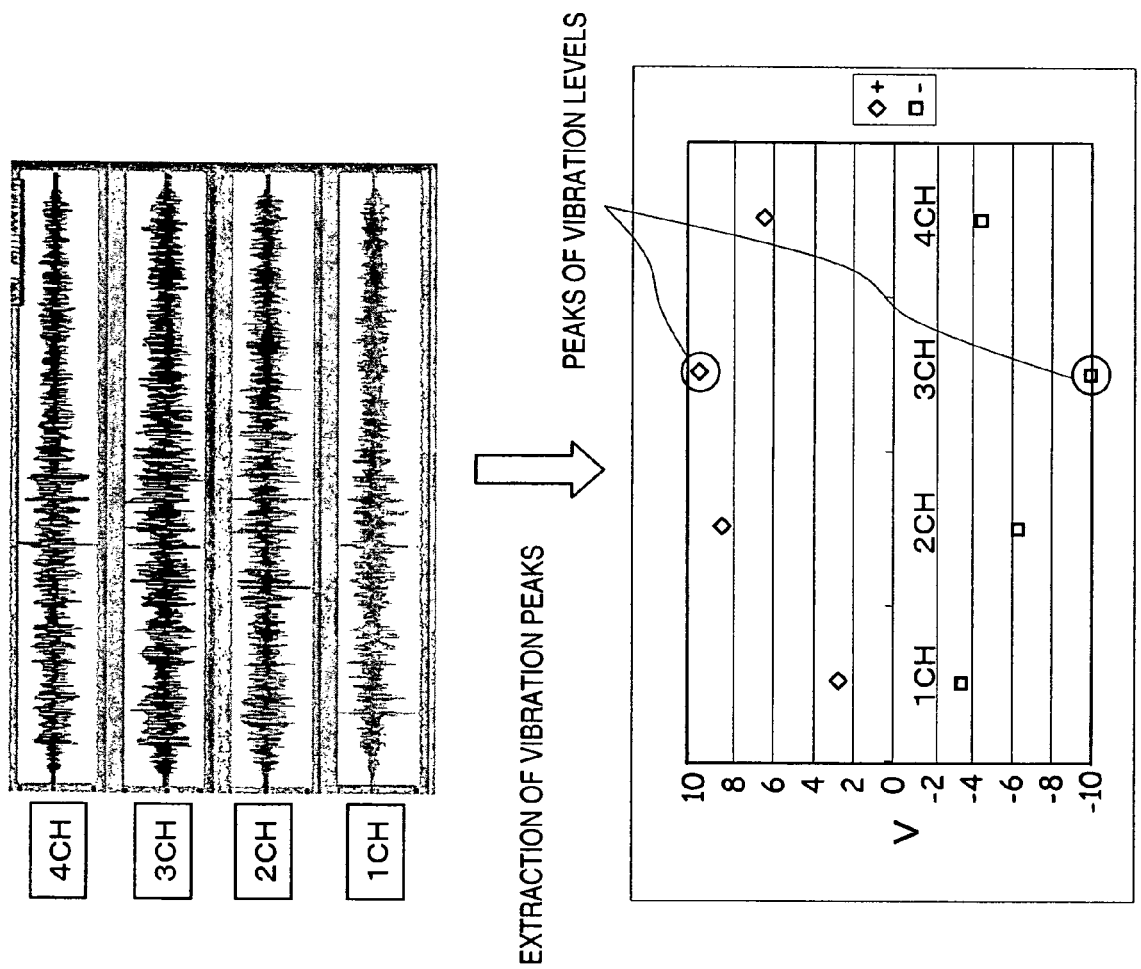
FIG. 4 is a graph of exemplary waveforms of the vibrations that are detected by the abnormal noise correction verification apparatus in accordance with the first embodiment of the present invention, which shows the peaks (maximum value and minimum value) of the vibration levels, for each vibration sensor, acquired from the relevant vibration waveform.

Referring now to FIGS. 2 to 5, the abnormal noise correction verification apparatus 100 will be explained in more detail in accordance with a first embodiment of the present invention. In particular, FIGS. 2 to 5 serve to explain the abnormal noise investigation using the abnormal noise correction verification apparatus 100 of the present invention. FIG. 2 is a block diagram that shows the general constitution of the abnormal noise correction verification apparatus 100 according to the present embodiment. FIG. 3 is an operational flow chart of the abnormal noise investigation of the abnormal noise correction verification apparatus 100 shown in FIG. 2. This flow chart corresponds to the investigating method procedure. In addition, FIG. 4 is a graph that shows one example of the waveforms of the vibrations that are detected by the abnormal noise correction verification apparatus 100, and also shows the peaks (maximum values and minimum values) of the vibration levels, which are acquired from those vibration waveforms, for each vibration sensor 10a to 10d.

As shown in FIG. 2, the abnormal noise correction verification apparatus 100 comprises the vibration sensors 10a to 10d discussed above, a signal extraction unit 11, a sensor selection unit 12, a peak hold unit 14, a peak display unit 15, and an output unit 13. The vibration sensors 10a to 10d are attached to the inspection target objects 20a to 20d, respectively, as shown in FIG. 1. The power supply switch 39 and the volume adjustment knob 38 that are shown in FIG. 1 are conventional devices. Accordingly, detailed descriptions of the power supply switch 39 and the volume adjustment knob 38 shown in FIG. 1 are omitted.

The vibration sensors 10a to 10d are configured and arranged so that they can be temporarily and freely attached to and detached from the inspection target objects 20a to 20d at desired locations during inspection, and are attached to the inspection target objects 20a to 20d. In other words, the vibration sensors 10a to 10d are preferably provided with a reusable connection in which the vibration sensors 10a to 10d can be attached and detached in a reinstallable manner. The vibration sensors 10a to 10d detect vibrations that are generated by the inspection target objects 20a to 20d, respectively, convert the detected vibrations to electrical signals that are proportional to the magnitudes of those vibrations, and send those electrical signals to the signal extraction unit 11. Mechanoelectric conversion devices, such as crystal type sensors (crystal type piezoelectric effect type accelerometers) and force balance sensors (servo accelerometers) can be used as the vibration sensors 10a to 10d. Furthermore, the present embodiment is explained as exemplified by a case wherein four vibration sensors are used, but the number of vibration sensors is not limited to four, and it is possible to use any plurality of (two or more) vibration sensors.

The signal extraction unit 11 receives signals from the vibration sensors 10a to 10d. Furthermore, for each of the vibration sensors 10a to 10d, the signal extraction unit 11 extracts the part of the received signal that is in a specific frequency band, thereby functioning as a signal extracting component. The signal extraction unit 11 includes a plurality of amplifiers (one for each of the vibration sensors 10a to 10d) and a plurality of band pass filters (one for each of the vibration sensors 10a to 10d). The amplifiers amplify the signals from the vibration sensors 10a to 10d. The band pass filters are configured such that only signals of a specific frequency of the signals output from the amplifier pass therethrough. Each of the amplifiers includes typical amplification factor adjustment circuits (not shown), e.g., the circuits related to the gain adjustment knob 35e and the gain adjustment knobs 35a to 35d that adjust the amplification factor. Each band pass filter can be modified in accordance with the frequency bands of the extracted signals, e.g., it can be configured as a low pass filter, a high pass filter, or a combination thereof.

The sensor selection unit 12 functions as a sensor selecting component that receives signals from the signal extraction unit 11 and selects a plurality of signals from among the received signals, i.e., it has a function that selects signals from two arbitrary vibration sensors (e.g., the vibration sensor 10a and the vibration sensor 10b). The sensor selection unit 12 includes a changeover switch, which a person operates in order to switch among the communication paths 11a to 11d through which signals are transmitted. This changeover switch, e.g., a rotary switch, selectively switches the electrical connection between the output unit 13 and the communication paths 11a to 11d of the signals that are extracted by the signal extraction unit 11. Preferably, the changeover switch includes two independent switches, which can be separately switched among the signals from the sensors 10a to 10d. Knobs (movable parts that can be moved by the direct application of external operational force) are attached to the changeover switch so that it can be operated by a person, e.g., the left ear channel selection switch 31a (L-CH) can be switched to the first channel 1 (CH1) and the right ear channel selection switch 31b (R-CH) can be switched to the second channel 2 (CH2), as shown in FIG. 1.

The output unit 13 functions as an outputting component that separately outputs the signals, which were selected by the sensor selection unit 12. Thus, the output unit 13 has a function of receiving two signals selected by the sensor selection unit 12 and then separately outputs those received signals. In addition, the output unit 13 can also be provided with a function that receives signals from the signal extraction unit 11, stores those received signals, processes the received signals, displays such, and the like.

The output unit 13 is preferably a sound wave output and processing apparatus, which is provided with a central processing unit, a storage apparatus that stores data needed for calculations, and the like. For example, the output unit 13 comprises the headphones 21 and the personal computer 22 shown in FIG. 1. Furthermore, the central processing unit executes various arithmetic processes. The storage apparatus establishes, for example, an area that is used to temporarily store the signals received from the signal extraction unit 11, as well as an area that stores an analysis program, which is for performing frequency analysis. As shown in FIG. 1, the headphones 21 and the personal computer 22 are connected to the main abnormal noise investigation unit 110 via the headphones output terminal 36*b* and the USB terminal 36*a*, respectively.

The peak hold unit 14 receives signals from the signal extraction unit 11, and, based thereon, acquires the peaks of the vibration levels, which are generated in a time series, and thereby functions as a peak holding component. The peak hold unit 14 has a typical peak hold circuit that acquires the peaks of the vibration levels (the maximum and minimum values of the vibration levels) that are received within the time period from the actuation of the peak hold function until it is stopped. The peak hold unit 14 also has a storage area, which stores the peaks of the vibration levels within the time period from the actuation of the peak hold function until it is stopped.

The peak display unit 15 receives signals from the peak hold unit 14, and displays the peaks of the vibration levels for each of the vibration sensors 10*a* to 10*d*, and thereby functions as a peak displaying component. The peak display unit 15 includes light emitting devices that display the peaks of the vibration levels so that they can be externally observed. These correspond to, for example, the vibration level meters 34 shown in FIG. 1.

As mentioned above, the inspection target objects 20*a* to 20*d* are the objects that are to be inspected for vibration problems. Furthermore, the present embodiment explained a case wherein there are four inspection target objects, but the present invention is not limited thereto, and can be adapted to any situation as long as there is at least one inspection target object.

The following is a detailed explanation of the abnormal noise investigation method, which is a performed by the abnormal noise correction verification apparatus 100 of the present invention. FIG. 3 is a flow chart that depicts the abnormal noise investigation process details of the abnormal noise correction verification apparatus 100 according to the present embodiment.

As shown in FIG. 3, the vibration sensors 10*a* to 10*d* are attached to the inspection target objects 20*a* to 20*d*, respectively (step S300). The vibration sensors 10*a* to 10*d* are attached by using, for example, magnetic force or adhesive power in accordance with the characteristics of the inspection target objects 20*a* to 20*d*. In so doing, the vibration sensors 10*a* to 10*d* can be configured so that they can be temporarily and freely attached to and detached from desired locations in accordance with the features of the inspection target objects 20*a* to 20*d*.

After performing the process of step S300, the amplification factor can be set in order to adjust the sensitivity of each vibration sensor 10*a* to 10*d*. The desired amplification factor is set in advance by estimating an approximate amplification factor based on empirical measurements taken beforehand, and using that estimated amplification factor as a reference. As discussed previously in FIG. 1, the overall sensitivity of the vibration sensors 10*a* to 10*d* is adjusted by the gain adjustment knob 35*e* in a single operation, and the sensitivities of the vibration sensors 10*a* to 10*d* are individually adjusted by the gain adjustment knobs 35*a* to 35*d*, respectively.

Next, the peak hold settings are input, i.e., the peak hold switch 40 is turned on (step S310).

Next, when the power supply switch 39 is turned on so that the vibration sensors 10*a* to 10*d* detect the vibrations that are generated by the inspection target objects 20*a* to 20*d* (step S320). The detected vibrations are sent to the signal extraction unit 11.

Now, the signal extraction unit 11 receives the signals from the vibration sensors 10*a* to 10*d*. Also, for each of the vibration sensors 10*a* to 10*d*, the signal extraction unit 11 extracts the part of the received signal that is in a specific frequency band (step S330). The extracted signals are sent to the sensor selection unit 12. The signals are extracted in a specific frequency band in order to prevent, as much as possible, a case wherein, for example, short time span-varying abnormal vibrations are generated in some frequency band by an inspection target object. Those abnormal vibrations or the effects of background noise are unfortunately embedded in normal vibrations, which make it difficult to determine whether the vibrations are abnormal.

Next, the personal computer 22 (i.e., part of the output unit 13) receives the signals from the signal extraction unit 11, and stores the relevant signal for each of the vibration sensors 10*a* to 10*d* (step S340). The signals are stored in the personal computer 22 because, for example, if abnormal vibrations are generated while a vehicle is traveling, then it will be necessary to cause the vehicle travel so as to reproduce the abnormal vibrations in order to investigate the problem location. However, background noise has a significant effect during travel that, depending on the constituent part of the vehicle, can make it difficult to determine the problem location. Thus, background noise creates the troublesome task of reproducing the abnormal vibrations by causing the vehicle to travel again and again. Accordingly, storing the signals of the vibration sensors 10*a* to 10*d*, which were sent from the signal extraction unit 11, in the personal computer 22 makes it possible to subsequently process them, output them as sound waves, and thereby analyze the vibrations, which is convenient because it is no longer necessary to cause the vehicle to travel again and again.

In addition, the vibrations are analyzed by a typical processing method, such as frequency analyzing the signals stored by the personal computer 22, wherein the vibration waveform is displayed for each of the vibration sensors 10*a* to 10*d*, and the peaks of the vibration levels are extracted and displayed (refer to FIG. 4). Furthermore, the personal computer 22 can be suitably used as needed.

Next, the peak hold unit 14 receives the extracted signals and acquires the peaks of the vibration levels, which are generated in a time series (step S350). Furthermore, with the process of step S350, the peaks of the vibration levels are acquired for the time period from the start to the end of the inspection. However, the operator can actuate or stop the peak hold function by pressing a peak hold button 40 (refer to FIG. 1) even during the inspection. Thus, the operator can acquire the peaks of the vibration levels starting at a desired inspection start time. In addition, it is also possible to display the peaks of the vibration levels acquired during a desired investigation time after the peak hold unit 14 has stored the peaks of the vibration levels and the peak hold function has been stopped.

Next, the peak display unit 15 receives the signals from the peak hold unit 14, and displays the peaks of the vibration levels for the vibration sensors 10a to 10d (step S360). The peaks of the vibration levels are displayed by, for example, the vibration level meters 34, one of which is provided for each of the vibration sensors 10a to 10d, as shown in FIG. 1.

However, the sensor selection unit 12 can receive the signals from the signal extraction unit 11 and select the signals of two arbitrary, different vibration sensors from among the received signals. Specifically, the signals from two arbitrary, different vibration sensors are selected by an operator, who is the person performing the investigation, selecting the signals of the desired vibration sensors by operating the left ear channel selection switch 31a and the right ear channel selection switch 31b. Providing the left ear channel selection switch 31a and the right ear channel selection switch 31b in the present embodiment, as shown in FIG. 1, makes it possible to select signals from two different, arbitrary vibration sensors by the operation of these two switches. Furthermore, the present invention is not limited to the two channel selection switches 31a and 31b in the illustrated embodiment. In other words, apparatus of the present invention can have a plurality of channel selection switches that corresponds to the number of output devices provided to the output unit 13.

Next, the method specifies the presence of a problem based on the selected signals, i.e., the method specifies the problem location (step S370). As discussed in the process of step S340, the method of specifying the problem location can specifically select the signals of different vibration sensors by the left ear headphone 21a and the right ear headphone 21b. Therefore, the problem location is specified while separately outputting the sound waves of two arbitrary signals, after which the operator listens to and compares the sound quality and the volume of the vibrations that are generated by the inspection target objects 20a to 20d while observing the peaks of the vibration levels displayed via the vibration level meters 34.

Specifically, as shown in FIG. 1, it can be seen that the highest peak is that of the vibration levels from the vibration sensor 10c, which corresponds to the vibration level meter 34 of the third channel 3 (CH3). Therefore, the inspection target object 20c, to which the vibration sensor 10c is attached, is specified as the problem location. Thus, the problem location is specified and the process ends. In this case, if the channel selection switch 31a or 31b is set so that the sound waves from the third channel 3 (CH3) can be heard with the headphones 21, and the volume of the sound waves from the third channel 3 is compared with the volume of the sound waves from another channel, then it can be expected that the former will sound the loudest.

Furthermore, it is also possible to use the personal computer 22 to determine the problem location by both listening with the headphones 21 and observing the peaks of the vibration levels displayed by the personal computer 22 or the vibration waveforms of the signals stored therein. For example, as shown in FIG. 4, the peak of the vibration levels is highest for the third channel 3 (CH3), which corresponds to the vibration sensor 10c. As a result, it can be seen that the inspection target object (glove compartment) 20c, to which the vibration sensor 10c is attached, is the problem location. Thus, the problem location is specified and the abnormal noise investigating process ends. Now a corrective action can be performed on the inspection target object (glove compartment) 20c, e.g., readjusting and/or tightening the glove compartment.

With the investigating method constituted as described above, the signals of two different, arbitrary vibration sensors are selected from a plurality of vibration sensors, the selected signals are simultaneously output, and the peaks of the vibration levels are displayed for the vibration sensors. As a result, even if listening to the vibrations in order to determine the problem location fails, it is possible to determine the problem location by observing the displayed peaks of the vibration levels. Accordingly, the specification of the problem is simplified, and the investigation time is markedly reduced. Thus, it is possible to significantly improve investigation efficiency.

In addition, if the personal computer 22 is used, then it is possible to store the signals of the vibration sensor 10a to 10d that are sent from the signal extraction unit 11, and to process and display those stored signals. As a result, the specification of the problem location is further simplified, the investigation time is markedly reduced, and investigation efficiency can be significantly improved.

Furthermore, the present embodiment was explained by illustrating a case wherein the signals from two vibration sensors were selected, but the present invention can be configured so that the signals from three or more vibration sensors are selected and so that the sound signals from these sensors can be separately and simultaneously heard.

Figure 5:
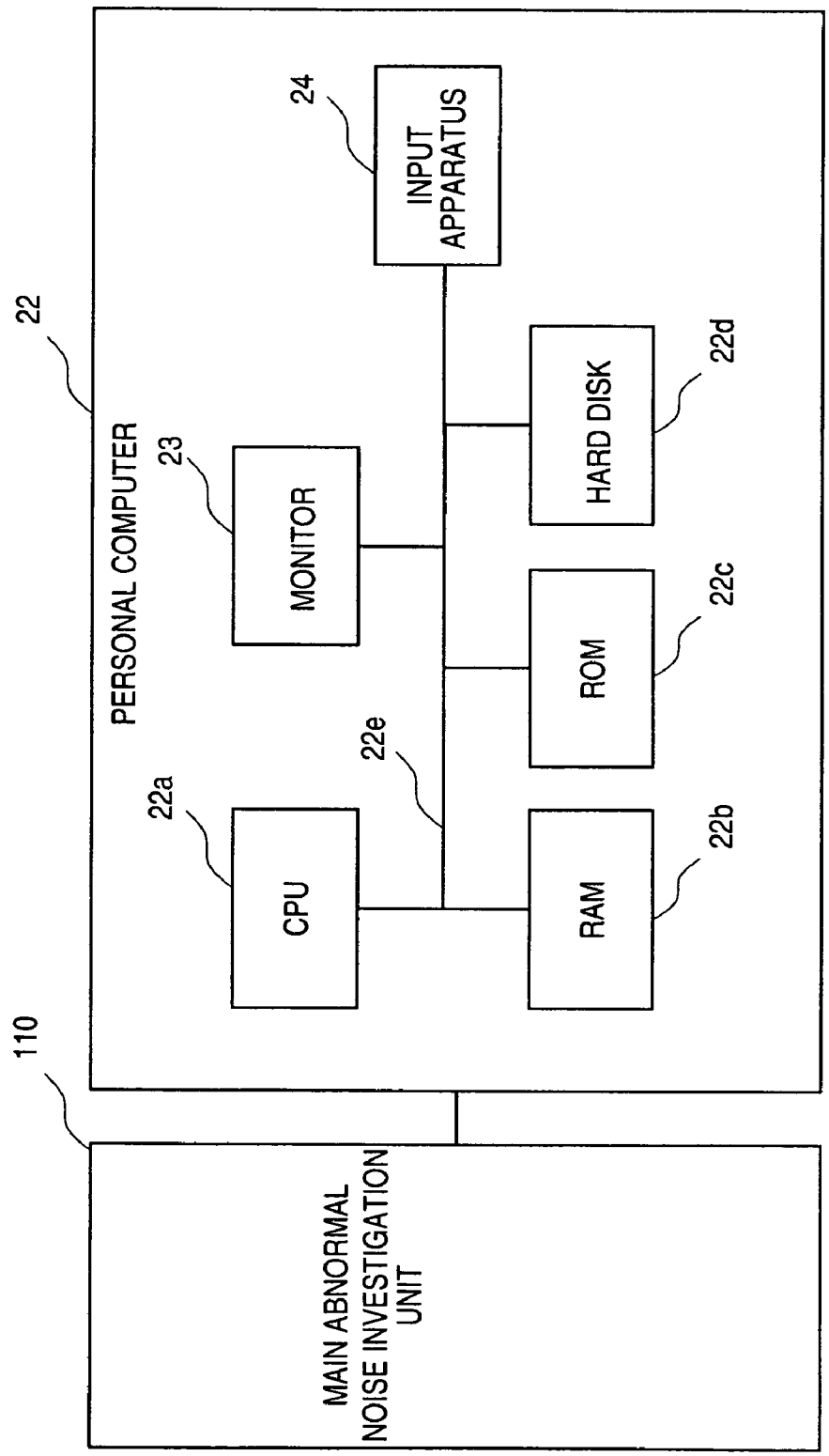
FIG. 5 is a schematic block diagram of a personal computer used in the abnormal noise correction verification apparatus in accordance with the first embodiment of the present invention.
Figure 6:
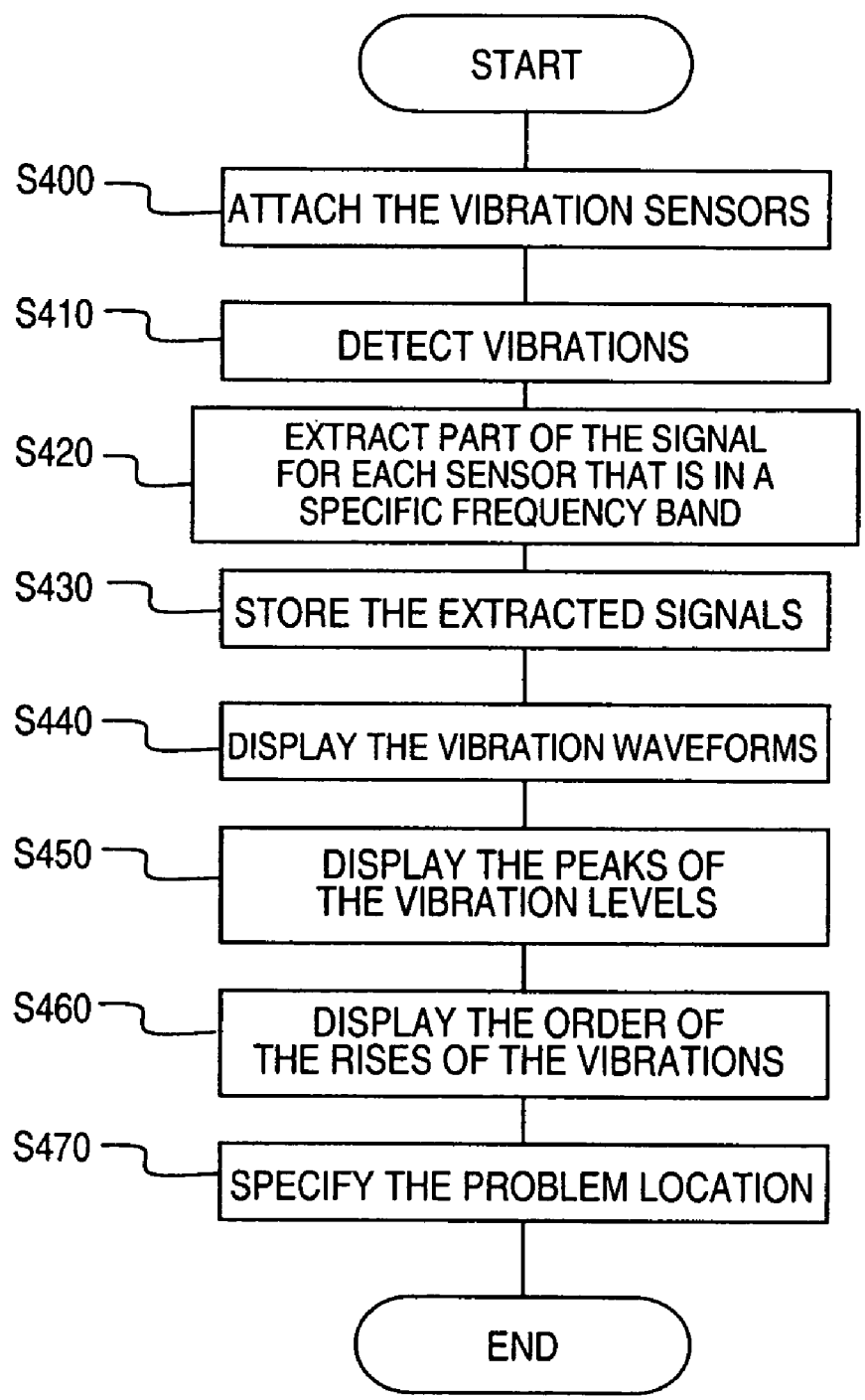
FIG. 6 is an operational flow chart of the operations executed by the abnormal noise correction verification apparatus in accordance with the first embodiment of the present invention.
Figure 7:
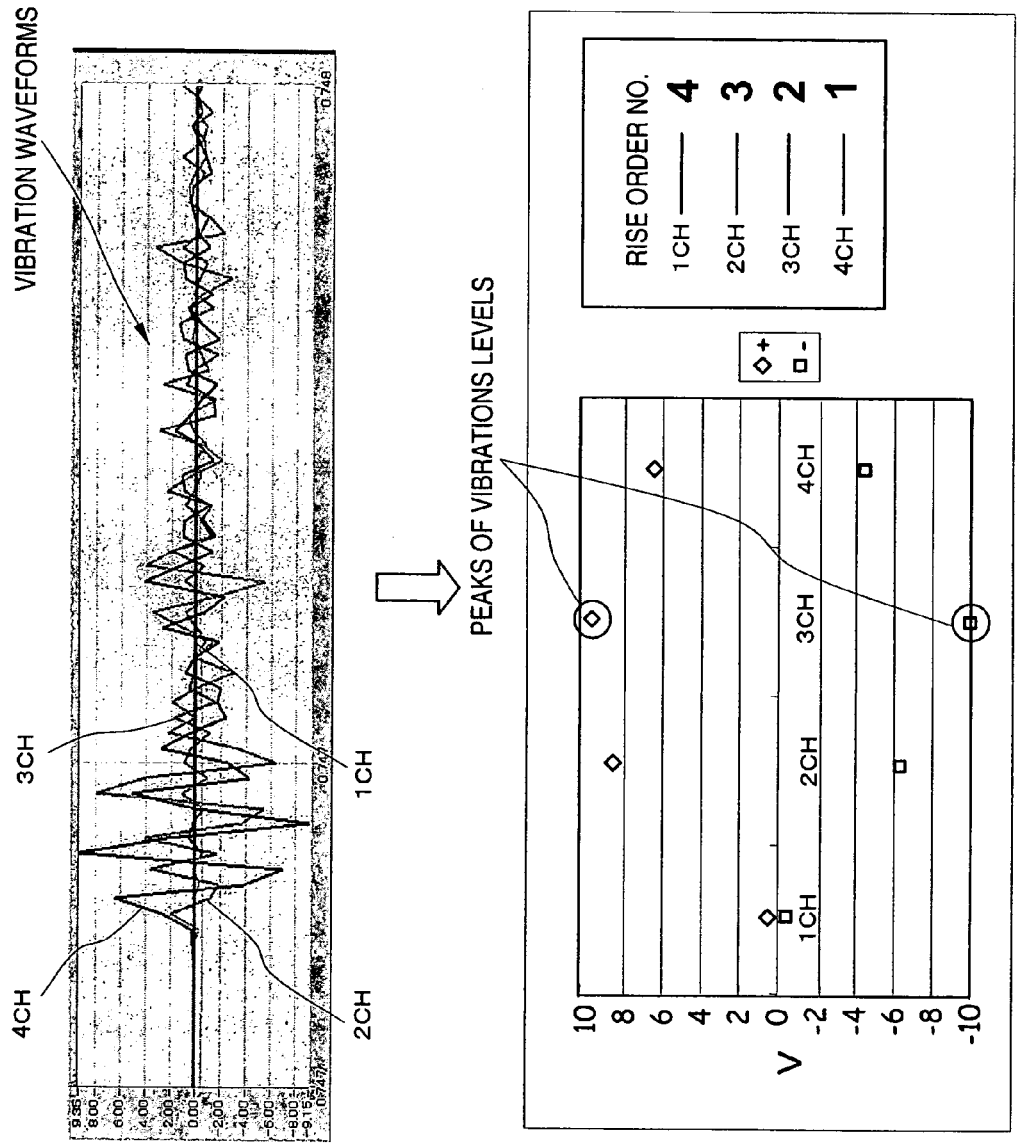
FIG. 7 is a graph of exemplary waveforms of the vibrations that are detected by the abnormal noise correction verification apparatus in accordance with the first embodiment of the present invention, which shows various physical quantities based on those vibration waveforms.

FIGS. 5 to 7 serve to explain other aspects of the abnormal noise investigation using the abnormal noise correction verification apparatus 100 of the present invention. FIG. 5 is a block diagram that shows the general constitution of the personal computer 22, which is part of the abnormal noise correction verification apparatus 100 shown in FIG. 1. FIG. 6 depicts an operational flow chart of the abnormal noise correction verification apparatus 100 shown in FIG. 1. In addition, this flow chart corresponds to the procedure of the investigating method of the abnormal noise correction verification apparatus 100 according to the present embodiment. FIG. 7 includes a graph, which depicts one example of the waveforms of the vibrations that are detected by the abnormal noise correction verification apparatus 100 according to the present embodiment, as well as a graph that depicts physical quantities that are derived based on the corresponding vibration waveforms.

With this illustrated embodiment, a problem location is specified principally by using the personal computer 22. Specifically, the signals of the vibration sensors 10a to 10d that are sent from the signal extraction unit 11 are stored, and the stored signals are then processed and displayed. Then, the problem location is specified based on those processed signals. Other than the point that the problem location is specified principally by using the personal computer 22, this method uses the abnormal noise correction verification apparatus 100 in the same manner as previously discussed. Thus, the explanation of common processes will be omitted for the sake of brevity.

FIG. 5 is a block diagram showing in more detail the general configuration of the personal computer 22 of the abnormal noise correction verification apparatus 100 according to the present invention. The personal computer 22 basically includes a CPU (Central Processing Unit) 22a, a RAM (Random Access Memory) device 22b, a ROM (Read Only Memory) device 22c, a hard disk 22d, the monitor 23, and an input apparatus 24. These components are mutually connected via a bus 22e so that they can exchange signals in a conventional manner. The CPU 22a executes the various arithmetic processes needed for analysis based on a typical frequency analysis program. The RAM 22b temporarily stores programs and data as work areas. The ROM is reference symbol 22c and pre-stores information, such as various programs and parameters that control the basic operation of the personal computer 22. The hard disk 22d stores the OS (operating system) and the programs and parameters that control the prescribed operations of the personal computer 22. The hard disk 22d pre-stores the programs needed for deriving the various abovementioned physical quantities, processing and displaying the information obtained from the analysis results, and performing frequency analysis. Furthermore, the hard disk 22d also functions as a storage area that stores, for example, the signals received from the signal extraction unit 11 as well as the analysis results. The monitor 23 is, for example, a CRT monitor or a liquid crystal display. The monitor 23 displays information or data obtained from the analysis results. The input apparatus 24 is a mouse, a keyboard, and/or a pointing device, such as a touch panel, and receives input from the operator. It will be apparent to those skilled in the art from this disclosure that the precise structure and algorithms for the personal computer 22 can be any combination of hardware and software that will carry out the functions of the present invention.

The personal computer 22 performs analysis based on the analysis program, which carries out frequency analysis needed to analyze the vibrations, and processes and displays the information obtained from the analysis results. The information obtained from the analysis results includes, for example, physical quantities, such as: the waveforms of the vibrations of the vibration sensors 10a to 10d; the order of the waveform rises obtained from the vibration waveforms (information that suggests which vibration sensor of the vibration sensors 10a to 10d had the earliest vibration waveform rise); the peaks of the vibration levels, the RMS values (root mean square: effective values); and the P-P values (peak-to-peak: maximum amplitude); and corresponds to various information obtained from the frequency analysis results.

Furthermore, the methods and the corresponding programs for calculating physical quantities, such as the vibration waveforms of the vibration sensors 10a to 10d, the peaks of the vibration levels, the RMS values, and the P-P values, are already well known in the art. Thus, a detailed description of these methods and corresponding programs for calculating physical quantities will be omitted.

The abnormal noise investigation according to the present embodiment is performed by using the personal computer 22 configured as described above.

FIG. 6 is a flow chart that depicts the process details of the abnormal noise correction verification apparatus 100 (refer to FIG. 1) according to the illustrated embodiment. The explanation of process details that are the same as those depicted in FIG. 2 will be omitted in order to avoid redundancy.

As depicted in FIG. 6, first, the vibration sensors 10a to 10d are attached to the inspection target objects 20a to 20d, respectively (step S400). Furthermore, the locations where the vibration sensors 10a to 10d are attached are the locations where it is presumed that abnormal vibrations are being generated. However, at this time, before attaching the vibration sensors 10a to 10d, a noise source visualization apparatus that makes it possible to visualize a sound field by, for example, a holographic method or a beam forming method, can be used first to identify areas that are potentially the locations at which abnormal vibrations are being generated.

Next, the power supply switch 39 is turned on so that the vibration sensors 10a to 10d detect vibrations that are generated by the inspection target objects 20a to 20d (step S410). The detected vibrations are sent to the signal extraction unit 11.

Next, the signal extraction unit 11 receives signals from the vibration sensors 10a to 10d, and extracts the part of the received signal of each of the vibration sensors 10a to 10d that is in a specific frequency band (step S420). The extracted signals are sent to the personal computer 22.

Next, the personal computer 22 (part of the output unit 13) receives the signals from the signal extraction unit 11 and stores the signal of each of the vibration sensors 10a to 10d (step S430).

Next, the personal computer 22 performs frequency analysis based on the stored signals, and displays information obtained from the analysis results on the monitor 23 (steps S440-S460). Specifically, as shown in FIG. 7, a vibration waveform is displayed for each of the vibration sensors 10a to 10d (step S440). The peak of the vibration level is displayed for each of the vibration sensors 10a to 10d (step S450), and the waveform rise order of the vibrations is displayed for each of the vibration sensors 10a to 10d (step S460).

Next, the presence of a problem is specified based on the information displayed on the monitor 23, i.e., the problem location is specified (step S470). The method of specifying the problem location is, specifically, to verify various physical quantities that are displayed on the monitor 23. In the present invention, the operator verifies the peak of the vibration levels and the waveform rise order of the vibrations for each of the vibration sensors 10a to 10d, and then makes an overall determination based on those physical quantities to determine the problem location. For example, referencing the vibration level peaks shown in FIG. 7, the peak of the vibration levels is highest for the third channel 3 (CH3), which corresponds to the vibration sensor 10c. Based on this result, the inspection target object 20c, to which the vibration sensor 10c is attached, is determined to be the problem location. However, if we reference the waveform rise order of the vibrations, the vibration waveform rises earliest for the fourth channel 4 (CH4), which corresponds to the vibration sensor 10d. Based on this result, the inspection target object 20d, to which the vibration sensor 10d is attached, is determined to be the problem location.

Generally, the inspection target object that corresponds to the channel for which the peak of the vibration levels is highest is determined to be the problem location. However, there are cases wherein the peaks of the vibration levels are affected by how the vibrations propagate, which differs depending on various factors, such as the material properties and the thickness of the inspection target objects as well as the state of the coupling between the inspection target objects and other members. For example, even if an inspection target object is not a problem location, the amplitude of its vibrations may be amplified due to interference, which will cause the peak of the vibration levels to rise or will cause the waveform of its vibrations to rise earlier due to differences in the propagation speed of the vibrations caused by the material properties of the inspection target objects. At such a time, a problem location can be specified by observing the vibration waveforms, or can be specified based on the peaks of the vibration levels. But it is preferable to specify the location with the earliest vibration waveform rise as the problem location. Furthermore, with the present embodiment, the problem location is specified by making an overall determination based on various physical quantities that are displayed on the monitor 23. The problem location is specified as described above, and then the process ends.

At this time, the problem location can be specified both by the various abovementioned physical quantities and by listening to and comparing the signals of two different, arbitrary vibration sensors, as discussed earlier.

With the abnormal noise investigation according to the present embodiment configured as described above, it is possible to use the personal computer 22 to store the signals of the vibration sensors 10a to 10d that are sent from the signal extraction unit 11, and to process those stored signals and display various physical quantities that are related to the vibrations. As a result, even if listening to the vibrations in order to determine the problem location results in failure, the problem location can be specified by observing the various physical quantities obtained based on the extracted signals. Accordingly, it is easier to determine the problem location, the investigation time is markedly reduced, and investigation efficiency can be significantly improved.

Figure 8:
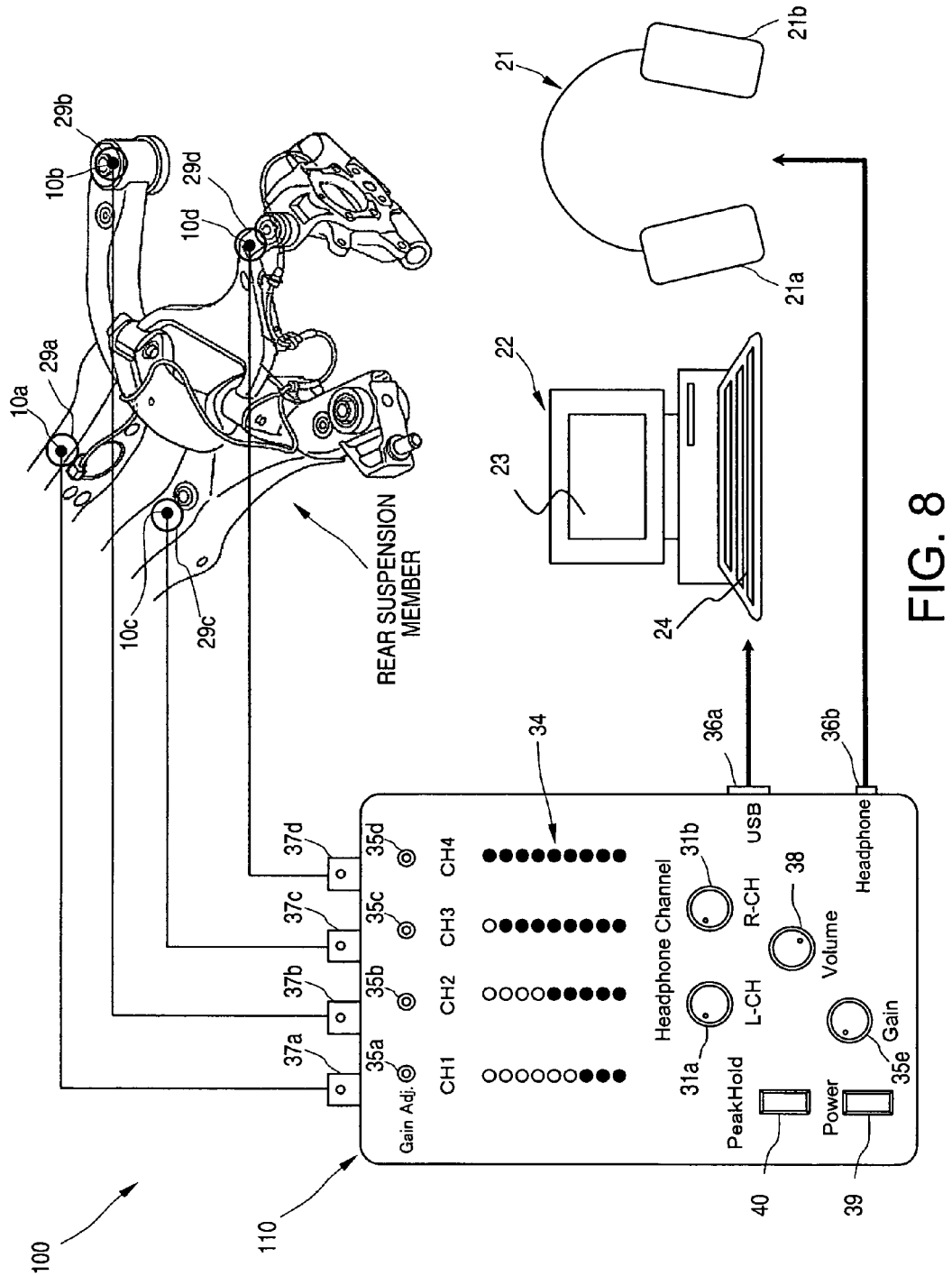
FIG. 8 is a diagrammatic illustration of the abnormal noise corrective action effectiveness verification in accordance with the first embodiment of the present invention, which illustrates searching for the locations in a part of a vehicle in which the abnormal vibrations are being generated.
Figure 9:
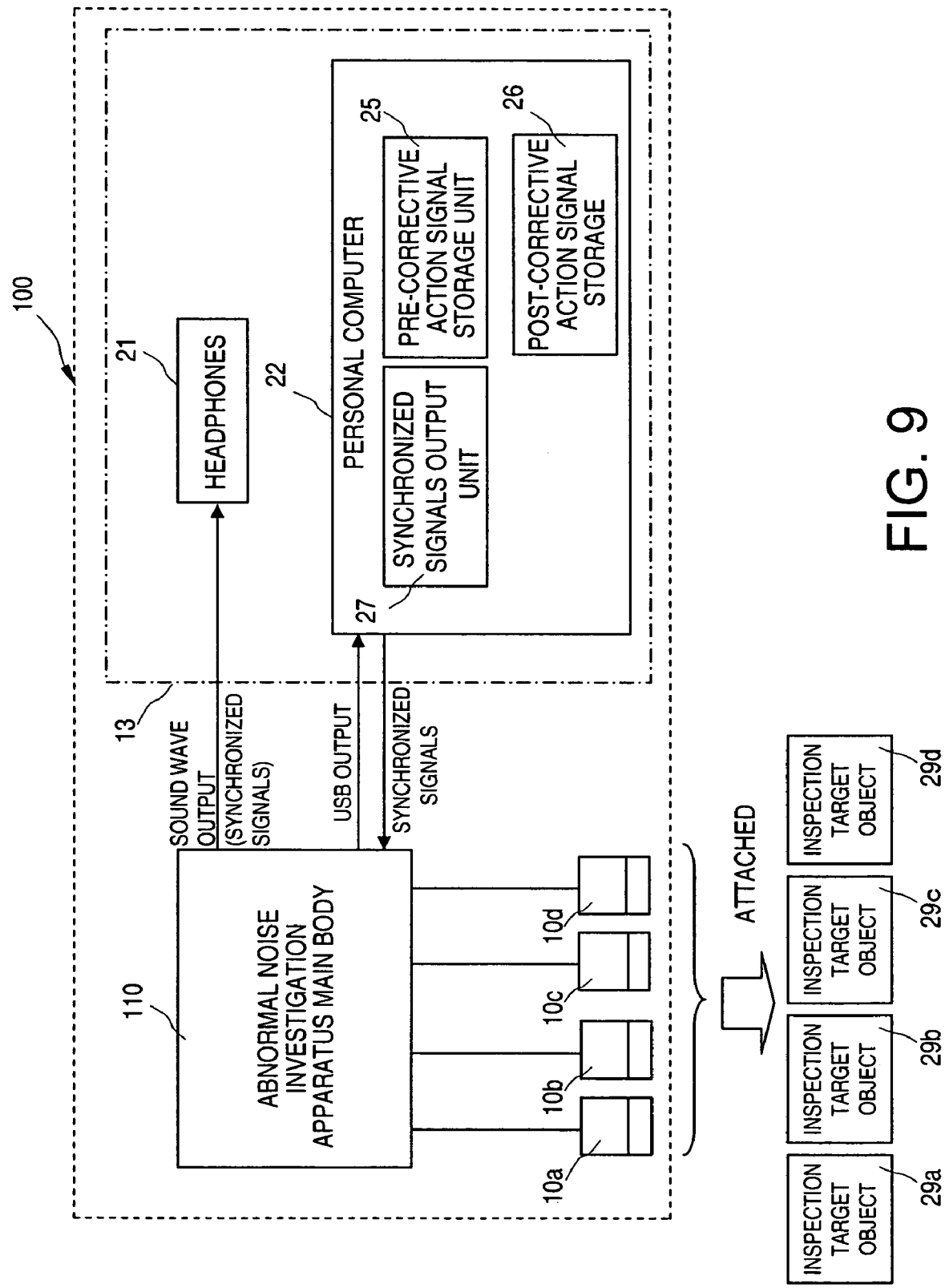
FIG. 9 is a schematic block diagram of the abnormal noise correction verification apparatus in accordance with the first embodiment of the present invention.
Figure 10:
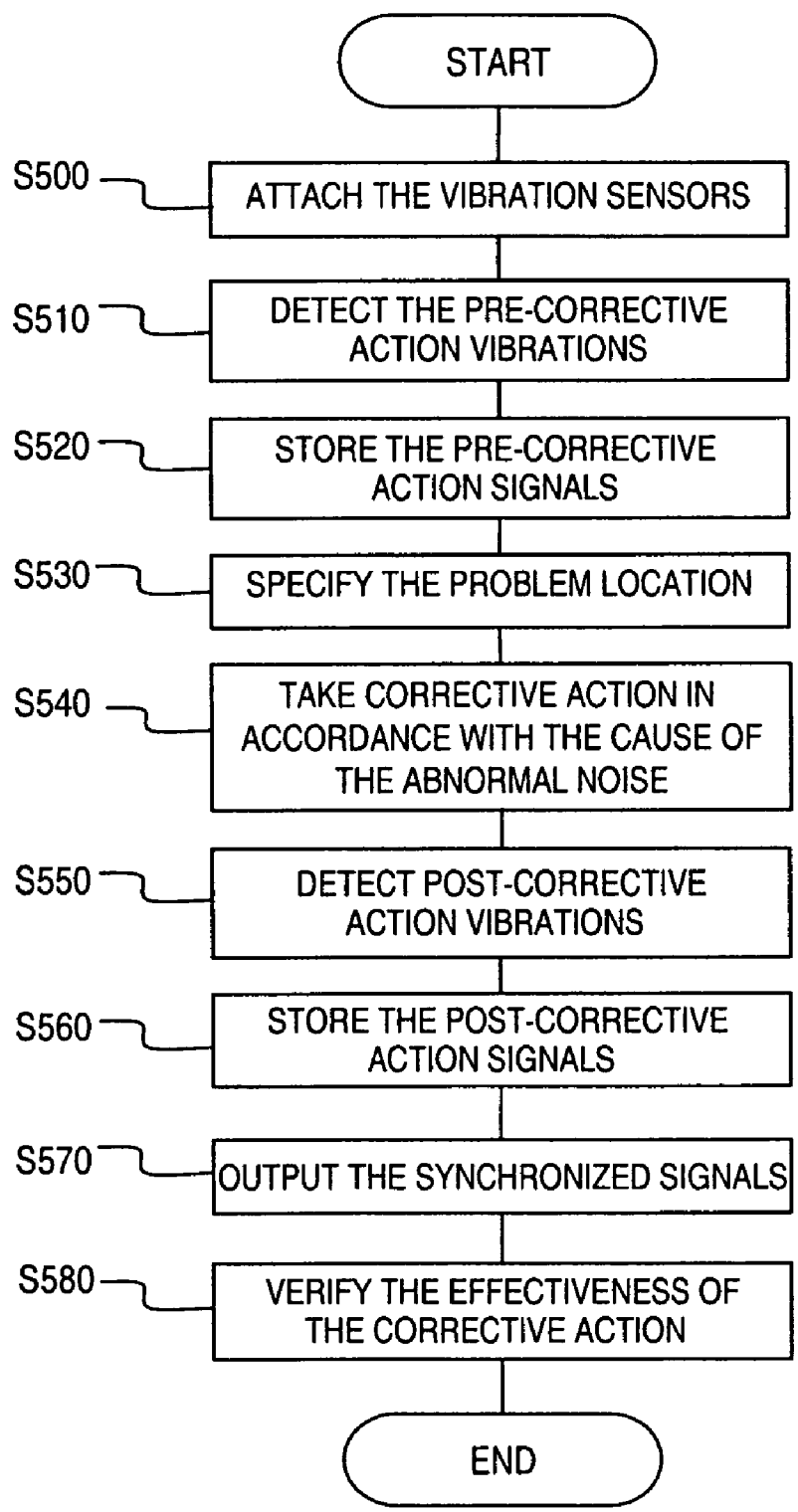
FIG. 10 is an operational flow chart of the operations executed by the abnormal noise correction verification apparatus in accordance with the first embodiment of the present invention.
Figure 11:
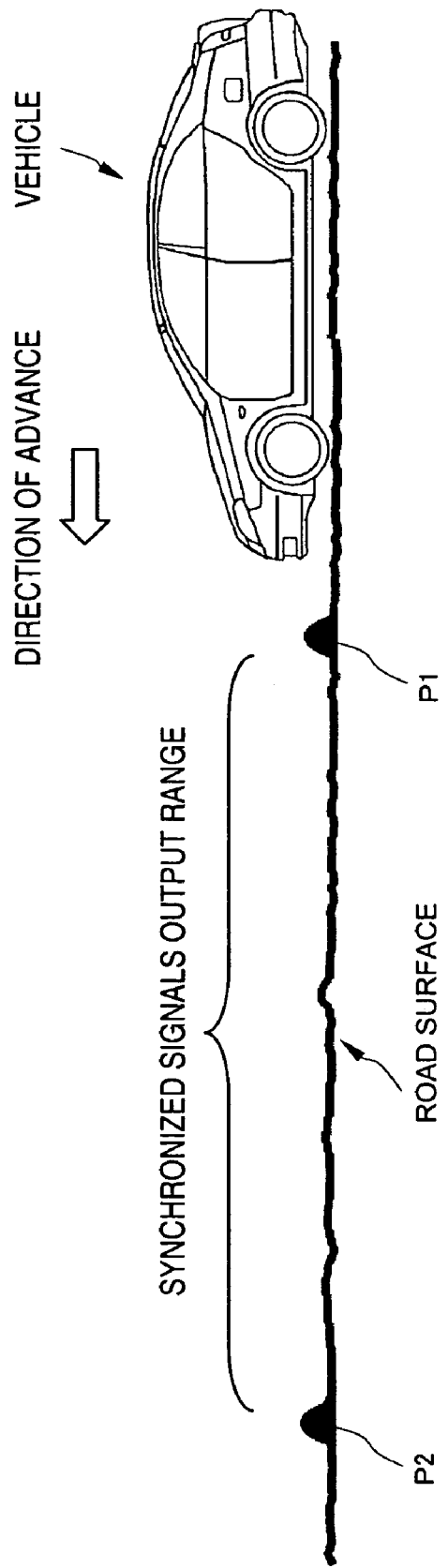
FIG. 11 is a diagrammatic illustration of the output of synchronized signals of the abnormal noise correction verification apparatus and an abnormal noise correction verifying method in accordance with the first embodiment of the present invention.

FIG. 8 through FIG. 11 serve to explain the abnormal noise correction verification apparatus 100 and the abnormal noise correction verifying method of the present invention as it is applied to a rear suspension. FIG. 9 is a block diagram, similar to FIG. 2, but showing certain components of the abnormal noise correction verification apparatus 100 according to the present embodiment in less detail and other components in move detail. FIG. 10 shows an operational flow chart corresponding to the procedure of the investigating method using the abnormal noise correction verification apparatus 100 according to the present embodiment. In addition, FIG. 11 is an explanatory diagram related to the output of synchronized signals of the abnormal noise correction verification apparatus 100 and the abnormal noise correction verifying method according to the present embodiment.

The personal computer 22 synchronizes and outputs, in a time series, the vibrations before (pre-corrective action) and after (post-corrective action) eliminating the cause of abnormal noise of the inspection target object. Furthermore, based on these outputs, it is possible to confirm the extent to which corrective action was effective by comparing the signals detected before corrective action with the signals detected after corrective action.

First, an overview of the abnormal noise correction verification apparatus and the abnormal noise correction verifying method according to the present invention will first be explained briefly in order to facilitate understanding of the present embodiment. FIG. 8 illustrates a case of searching for a part of a vehicle where abnormal vibrations are being generated. The abnormal noise correction verification apparatus 100 is used with the following procedure when searching for the part of a vehicle where abnormal vibrations are being generated. Furthermore, the abnormal vibration investigation procedure is basically performed by the abovementioned abnormal noise investigation procedure. Accordingly, any explanation that is the same as that of the procedure discussed earlier is omitted to avoid redundancy.

The following explanation illustrates a case wherein a complaint is received to the effect that abnormal vibration noise can be heard in the vicinity of the rear suspension when the vehicle is advancing (traveling) on a prescribed route. Given that abnormal vibration noise is being generated in the vicinity of the rear suspension, it is generally presumed that a part in the vicinity of the rear suspension is the noise source. FIG. 8 illustrates an example wherein each region of a rear suspension member is set as an inspection target object. Accordingly, the vibration sensors 10a to 10d are attached to the problem locations presumed to be the noise source. At this time, the vibration sensors 10a to 10d may be attached after using the abovementioned noise source visualization apparatus to identify potential problem locations.

At this time, with the present embodiment, the vibration sensor 10d is attached to a location that is different from the problem location presumed to be the noise source. Specifically, the vibration sensor 10a is attached to a region 29a, which is the problem location presumed to be the noise source, the vibration sensor 10b is attached to a region 29b, and the vibration sensor 10c is attached to a region 29c. FIG. 8 shows an example wherein the vibration sensor 10d is attached to the region 29d of a rear suspension member where it can satisfactorily detect vibrations input from the tires in accordance with the road surface unevenness. Furthermore, each of the vibration sensors 10a to 10d is attached by using a releasable fastening device, such as a magnet or double-sided tape.

Furthermore, the search for abnormal vibrations is started by pressing the power supply switch 39 and the peak hold switch 40. When the power supply switch 39 of the main abnormal noise investigation unit 110 is turned on, signals in accordance with the magnitude of the vibrations, which are detected by the vibration sensors 10a to 10d, are input to the main abnormal noise investigation unit 110 via the sensor connection terminals 37a to 37d.

The inputted signals are input to the personal computer 22 via the USB terminal 36a, and are simultaneously outputted to the headphones 21 via the headphones output terminal 36b, and the peaks of the vibration levels, which are generated in a time series, extracted from those inputted signals are held by the vibration level meters 34, one of which is provided for each of the vibration sensors 10a to 10d.

In addition, the signals inputted to the personal computer 22 are stored as signals before corrective action is taken with respect to the problem location (before eliminating the cause of abnormal noise), and the stored signals are processed and then displayed on the monitor 23. In addition, the signals inputted to the headphones 21 are output as sound waves from the left ear headphone (L-CH) 21a and the right ear headphone (R-CH) 21b of the headphones 21.

As previously explained above, the problem location is specified either by someone searching by listening to the sound waves output from the left ear headphone (L-CH) 21a and the right ear headphone (R-CH) 21b and observing the peaks of the vibration levels, which are generated in a time series, displayed via the vibration level meters 34, or by observing the results of the analysis performed by the personal computer 22. For example, referencing FIG. 8, it can be seen that the vibration level meter 34 that has the highest level is the one that corresponds to the third channel 3 (CH3). As a result, even by just looking at this display, it is possible to specify that the vibration sensor 10c, which corresponds to the third channel 3, is at the problem location, i.e., that the region 29c is the problem location. Furthermore, although the display shows that the vibration level meter 34 that corresponds to the fourth channel 4 (CH4) has the highest level, the region 29d, which corresponds to the fourth channel 4, is excluded because it is not a location that is presumed to be the problem location.

As described above, after the region 29c is specified as the problem location, corrective action to address the problem is taken, i.e., corrective action (repair work and the like) that is in accordance with the cause of abnormal noise (in the explanation below, the time before taking corrective action for the cause of abnormal noise is called "before corrective action", and the time after taking corrective action for the cause of abnormal noise is called "after corrective action"). Furthermore, after performing the work of eliminating the cause of the abnormal noise, the vehicle is caused to travel the same route that it traveled before corrective action and with the same travel pattern. Then, the vibrations at the region 29c, which was the problem location, are once again detected, and the vibrations, which are at the region 29d and correspond to the unevenness of the road surface, are inputted and detected by the vibration sensor 10d. The detected signals are stored in the personal computer 22 as the signals detected after corrective action.

Furthermore, if prescribed instruction information is input to the personal computer 22 by the operator, the personal computer 22, based on that instruction information, synchronizes and outputs the signals detected before corrective action and the signals detected after corrective action. Furthermore, based on these outputted signals, the effectiveness of the corrective action taken with respect to the problem is verified. For example, it is possible to compare the synchronized, outputted signals (herein below, called the "synchronized signals") by outputting them in stereo using a sound wave output apparatus (not shown), such as speakers, or by electrically connecting the sensor connection terminals 37a to 37d and the personal computer 22 and listening to those signals using the headphones 21 via the main abnormal noise investigation unit 110.

Thus, with the abnormal noise correction verification apparatus 100 according to the present invention, it is possible to easily verify the effectiveness of the action taken to correct the problem because signals that are detected at different times, i.e., before and after taking action to correct the problem, are synchronized and output.

The following is a detailed explanation of the abnormal noise correction verification apparatus 100 according to the present embodiment, referencing FIG. 9. The present embodiment uses the personal computer 22 to synchronize and output an inspection target object's vibrations in a time series before eliminating the cause of abnormal noise (before corrective action) and after eliminating the cause of abnormal noise (after corrective action). The following detailed description of the constituent elements related to the abnormal noise investigation discussed earlier will be omitted in order to avoid redundancy.

As shown in FIG. 9, the abnormal noise correction verification apparatus 100 comprises the vibration sensors 10a to 10d, the main abnormal noise investigation unit 110, the personal computer 22 and the headphones 21 as previously mentioned. The vibration sensors 10a to 10d are attached to inspection target objects 29a to 29d, respectively, which are shown in FIG. 8.

The vibration sensors 10a to 10d are used to detect vibrations of the inspection target objects 29a to 29d when the vehicle is advancing along the prescribed route. Furthermore, the vibration sensor 10d is attached to the inspection target object 20d where it can detect inputted vibrations that correspond to the topology of the road surface on which the vehicle is advancing when traveling on the prescribed route.

The main abnormal noise investigation unit 110 functions as an abnormal noise investigating component. Based on the signals outputted from the vibration sensors 10a to 10d, the abnormal noise investigation unit 110 investigates whether there is a cause of abnormal noise related to the inspection target objects 29a-29c. The main abnormal noise investigation unit 110 is shown in detail in FIGS. 1 and 2, as discussed above.

As shown in FIG. 9, the personal computer 22 has a pre-corrective action signal storage unit 25, a post-corrective action signal storage unit 26, and a synchronized signals output unit 27. These units 25 to 27 of the personal computer 22 are formed by linking of the CPU 22a, the RAM 22b, the ROM 22c, and the hard disk 22d, which are shown in FIG. 5. Furthermore, the CPU 22a controls the abovementioned units and executes the necessary arithmetic processes, and the ROM 22c prestores, for example, parameters and various programs that control the abovementioned units as well as the basic operation of the personal computer 22. Preferably, the pre-corrective action signal storage unit 25 and the post-corrective action signal storage unit 26 are formed by the hard disk 22d. The following is a detailed explanation of the pre-corrective action signal storage unit 25, the post-corrective action signal storage unit 26, and the synchronized signals output unit 27.

The pre-corrective action signal storage unit 25 stores, in a time series, the signals (vibration signals) that are outputted from the vibration sensors 10a to 10d attendant with the vibrations detected by the vibration sensors 10a to 10d, and functions as a pre-corrective action signal storing component. The pre-corrective action signal storage unit 25 associates and stores, for each of the vibration sensors 10a to 10c, the signal detected by the respective vibration sensor from the respective one of inspection target objects 29a to 29c before corrective action with the signal detected by the vibration sensor 10d from the inspection target object 20d before corrective action.

When the main abnormal noise investigation unit 110 has determined that there is a cause of abnormal noise related to the inspection target objects 29a to 29c (the present embodiment describes an example wherein there is a cause of abnormal noise related to the inspection target object 21c, as previously explained), the post-corrective action signal storage unit 26 stores, in a time series, the signals outputted by the vibration sensors 10a to 10d attendant with the vibrations detected by the vibration sensors 10a to 10d when the vehicle is advancing along the abovementioned prescribed route after the elimination of the cause of abnormal noise. The post-corrective action signal storage unit 26 functions as a post-corrective action signal storing component. The post-corrective action signal storage unit 26 also associates and stores, for each of the vibration sensors 10a-10c, the signal detected by the respective vibration sensor from the respective one of the inspection target objects 29a to 29c after corrective action with the signal detected by the vibration sensor 10d from the inspection target object 20d after corrective action.

The synchronized signals output unit 27 synchronizes and separately outputs the signals that were detected within the range of the abovementioned prescribed route and that are stored in the pre-corrective action signal storage unit 25, as well as the signals that were detected within the identical specified range and that are stored in the post-corrective action signal storage unit 26. Thus, the synchronized signals output unit 27 functions as a signal outputting component. The synchronized signals outputted from the synchronized signals output unit 27 can be outputted, for example, in stereo as sound waves by using a sound wave output apparatus (not shown), such as speakers, or, by electrically connecting the sensor connection terminals 37a to 37d and the personal computer 22, in stereo as sound waves by using the headphones 21 via the main abnormal noise investigation unit 110.

Furthermore, the present embodiment explained an example wherein there are three inspection target objects, but the present invention is not limited thereto, and can be adapted to any situation as long as there is at least one inspection target object.

The following is a detailed explanation of a corrective action effectiveness verifying method of the abnormal noise correction verification apparatus 100 of the present invention, referencing FIG. 10.

FIG. 10 is a flow chart that depicts the process details of the abnormal noise correction verification apparatus 100 according to the present embodiment; process details in FIG. 10 that are identical to those in FIG. 3 and in FIG. 6 are omitted in order to avoid redundancy.

As shown in FIG. 10, first, the vibration sensors 10a to 10d are attached to the inspection target objects 29a to 29d, respectively (step S500). Furthermore, the vibration sensors 10a to 10c are attached to the inspection target objects 21a to 21c, which are presumed to be generating abnormal vibrations, and the vibration sensor 10d is attached to the inspection target object 21d where it can satisfactorily detect inputted vibrations that correspond to the topology of the road surface on which the vehicle is advancing when traveling on the prescribed route.

Next, if the vehicle is caused to travel along the prescribed route and the power supply switch 39 is turned on, then vibrations generated by the inspection target objects 20a to 20d are detected by the vibration sensors 10a to 10d, and those detected vibrations are converted to electrical signals and sent to the personal computer 22 via the main abnormal noise investigation unit 110 (step S510). Furthermore, with the present process details, if the vehicle travels along the abovementioned prescribed route, it is preferable that the vehicle travel during the investigation time along a road surface that has at least one uneven portion where the displacement of the vehicle in the vertical direction is extremely large.

For example, if the vehicle is caused to travel along the abovementioned prescribed route, then, as shown in FIG. 11, the vehicle is caused to pass a location P1, which has an uneven portion that greatly displaces the vehicle in the vertical direction, immediately after the investigation starts, and is then caused to pass a location P2, which has an uneven portion that greatly displaces the vehicle in the vertical direction, immediately after the investigation ends. Although the details are discussed later, when the vehicle is caused to pass the locations P1 and P2, which have the abovementioned uneven portions, they serve as triggers for synchronizing and outputting the signal that is output from the vibration sensor 10d with the signals stored in the pre-corrective action signal storage unit 25 and the signals stored in the post-corrective action signal storage unit 26.

Next, the personal computer 22 stores, in a time series, the signals that were received via the main abnormal noise investigation unit 110, i.e., the signals outputted by the vibration sensors 10a to 10d attendant with the vibrations detected by the vibration sensors 10a to 10d (step S520). At this time, the signals outputted from the vibration sensors 10a to 10c and the signal outputted from the vibration sensor 10d are associated and stored in the pre-corrective action signal storage unit 25. Furthermore, the present invention can also be configured so that the signals that are detected when the vehicle travels on one road surface and the signals that are detected when the vehicle travels on another road surface are stored separately in the pre-corrective action signal storage unit 25.

Next, the presence of a problem is specified, i.e., a problem location is specified (step S530) in the manner as described above with reference to steps S320 to S370 of FIG. 3 and steps S420 to S470 of FIG. 6. Thus, the preferred methods of specifying the problem location has already been explained, and the explanations of these processes will therefore be omitted. Furthermore, in the illustrated embodiment, as shown in FIG. 8, if a person examines the display of the vibration level meters 34, it can be seen that the highest peak is that of the vibration levels from the vibration sensor 10d, which corresponds to the fourth channel 4 (CH4). Nevertheless, because the vibration sensor 10d is attached to the inspection target object 21d in order to detect vibrations that are inputted in accordance with the topology of the road surface on which the vehicle is advancing, the problem location is specified by excluding the information related to the fourth channel 4 (CH4).

Accordingly, because the highest peak is that of the vibration levels from the vibration sensor 10c, which corresponds to the third channel 3 (CH3), it is possible, based on this result, to specify that the inspection target object 29c, to which the vibration sensor 10c is attached, is the problem location. Of course, the problem location can be specified by making an overall determination of the various physical quantities displayed on the monitor 23, as explained above.

Next, corrective action is taken with respect to the problem location in accordance with the cause of abnormal noise (step S540).

Now, the vehicle is once again caused to travel the identical travel pattern along the identical route before taking corrective action, and the vibrations of the inspection target objects 29a to 29d after corrective action are detected (step S550). With the present process details, the vibrations after corrective action are detected by executing a process that is substantially the same as that of steps S500 to S510. Furthermore, after taking corrective action, the vibration sensors may be attached just to the problem location and to the inspection target object where it can satisfactorily detect the inputted vibrations that correspond to the topology of the road surface on which the vehicle is traveling, and the vibration sensors may then detect the vibrations.

Next, the personal computer 22 stores, in a time series, the signals outputted from the vibration sensors 10a to 10d attendant with the vibrations detected by the vibration sensors 10a to 10d (step S560). At this time, the signals that are outputted from the vibration sensors 10a to 10c are associated with the signal that is outputted from the vibration sensor 10d, and then stored in the post-corrective action signal storage unit 26. Furthermore, the present invention can be configured so that the pre-corrective action signal storage unit 25 separately stores the signals that are detected when the vehicle is traveling on one road surface and the signals that are detected when the vehicle is traveling on another road surface.

Next, the operator inputs, to the input apparatus 24, instruction information to output the signals stored in the pre-corrective action signal storage unit 25 and the signals stored in the post-corrective action signal storage unit 26. Furthermore, based on the abovementioned instruction information, the synchronized signals output unit 27 synchronizes and outputs the signals stored in the pre-corrective action signal storage unit 25 and the signals stored in the post-corrective action signal storage unit 26 (step S570).

The following is a detailed explanation of the processes for synchronizing and outputting the signals stored in the pre-corrective action signal storage unit 25 and the signals stored in the post-corrective action signal storage unit 26.

The signal of the vibration sensor 10d that is stored in the pre-corrective action signal storage unit 25 and the signal of the vibration sensor 10d that is stored in the post-corrective action signal storage unit 26 each have two high vibration levels that are detected by the passage of the vehicle over the locations P1 and P2 (refer to FIG. 11), which have the abovementioned road surface uneven portions, as explained by the process of step S510. These two high vibration levels function as triggers to synchronize and output the signal stored in the pre-corrective action signal storage unit 25 and the signal stored in the post-corrective action signal storage unit 26.

Specifically, using the point in time when the level of vibrations that are detected by the vibration sensor 10d initially reach (or exceed) a prescribed vibration level (a vibration level not detected on a typical road surface) as a first trigger (the signal detected when the vehicle passes the location P1, which has an uneven portion, is set as the first trigger) and using the point in time when the level of the vibrations that are detected by the vibration sensor 10d next reach (or exceed) the prescribed vibration level as a second trigger (the signal detected when the vehicle passes the location P2, which has an uneven portion, is set as the second trigger), the parts of the signal of the vibration sensor 10c (the vibration sensor that is attached to the problem location) that is stored in the pre-corrective action signal storage unit 25 and the signal of the vibration sensor 10c that is stored in the post-corrective action signal storage unit 26 that are within the investigation time that spans from the abovementioned first trigger to the abovementioned second trigger are extracted and output. Specifically, the signals that are detected in the synchronized signals output range, which is shown in FIG. 11, are output.

As a result, it is possible to synchronize and output the signal that is stored in the pre-corrective action signal storage unit 25 and that was detected within a specified range of the specified route with the signal that is stored in the post-corrective action signal storage unit 26 and that was detected within the identical specified range. As was previously explained, the present invention can also be configured so that the synchronized signals, which are output from the synchronized signals output unit 27, are output as sound waves using a sound wave output apparatus (not shown), such as speakers, or, by electrically connecting the sensor connection terminals 37a to 37d and the personal computer 22, as sound waves from headphones 21 via the main abnormal noise investigation unit 110.

Next, based on the abovementioned synchronized signals, the operator verifies the extent to which the corrective action taken was effective by listening to and comparing the signal detected before corrective action and the signal detected after corrective action simultaneously (step S580), whereupon the process ends.

The present embodiment explained a case wherein using the point in time when the level of vibrations that are detected by the vibration sensor 10d initially reach (or exceed) a prescribed vibration level as a first trigger and using the point in time when the level of the vibrations that are detected by the vibration sensor 10d next reach (or exceed) the prescribed vibration level as a second trigger, the parts of the signal of the vibration sensor 10c (the vibration sensor that is attached to the problem location) that is stored in the pre-corrective action signal storage unit 25 and the signal of the vibration sensor 10c that is stored in the post-corrective action signal storage unit 26 that are within the investigation time that spans from the abovementioned first trigger to the abovementioned second trigger are extracted and output. However, the present invention is not limited thereto and may be configured so that when the vibrations after corrective action are detected, the abovementioned first trigger is used as the trigger to synchronize and output the signals that are stored in the pre-corrective action signal storage unit 25. In so doing, it is possible to output the signals stored in the pre-corrective action signal storage unit 25 while outputting the post-corrective action signal from the signal extracting component. As a result, it is possible to listen to the vibrations that were detected before corrective action even when causing the vehicle to travel and detecting the vibrations after corrective action, and it is therefore possible to reduce the time needed to verify the effectiveness of the corrective action.

Figure 12:
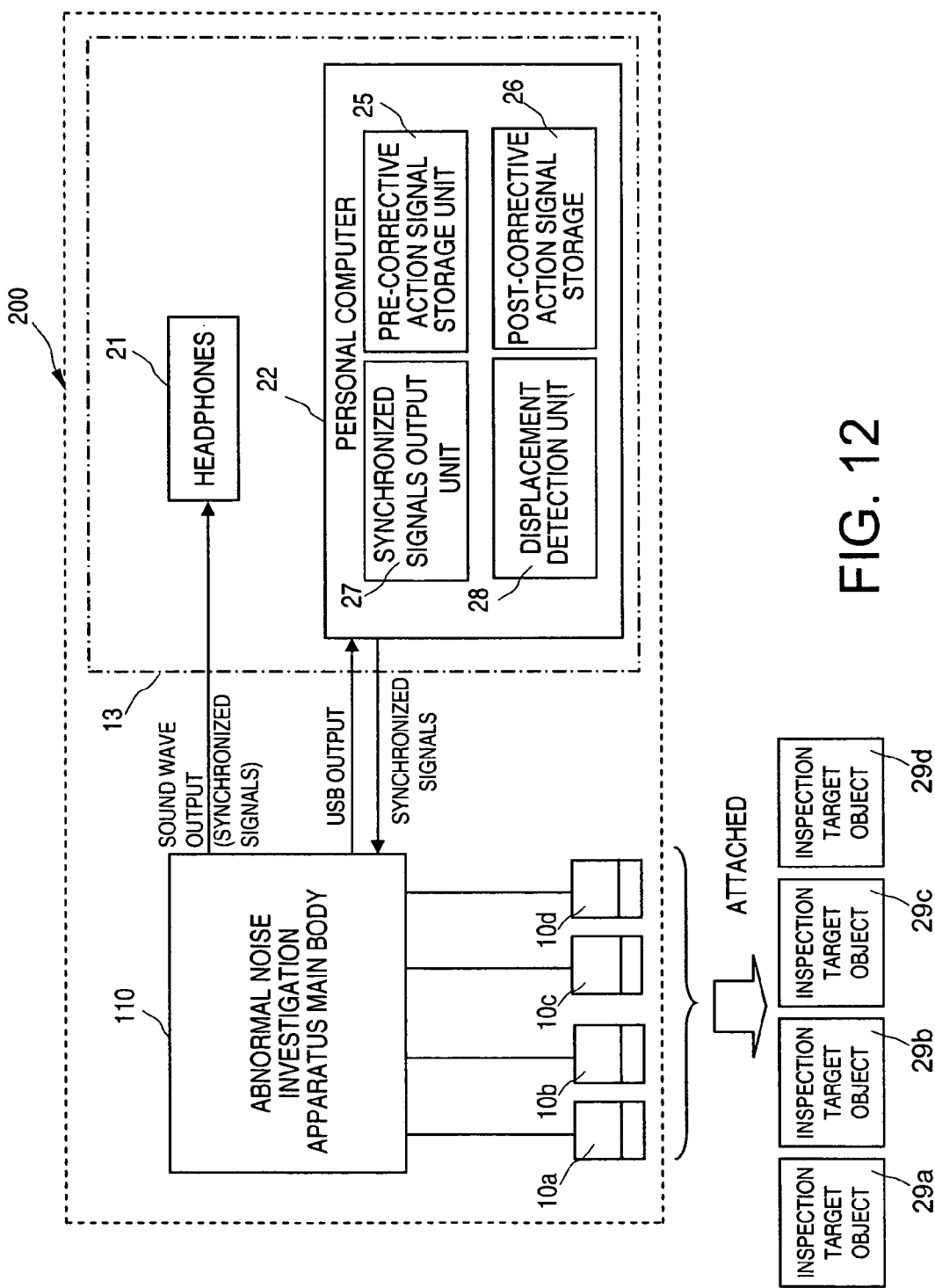
FIG. 12 is a schematic block diagram of the abnormal noise correction verification apparatus in accordance with a second embodiment of the present invention.
Figure 13:
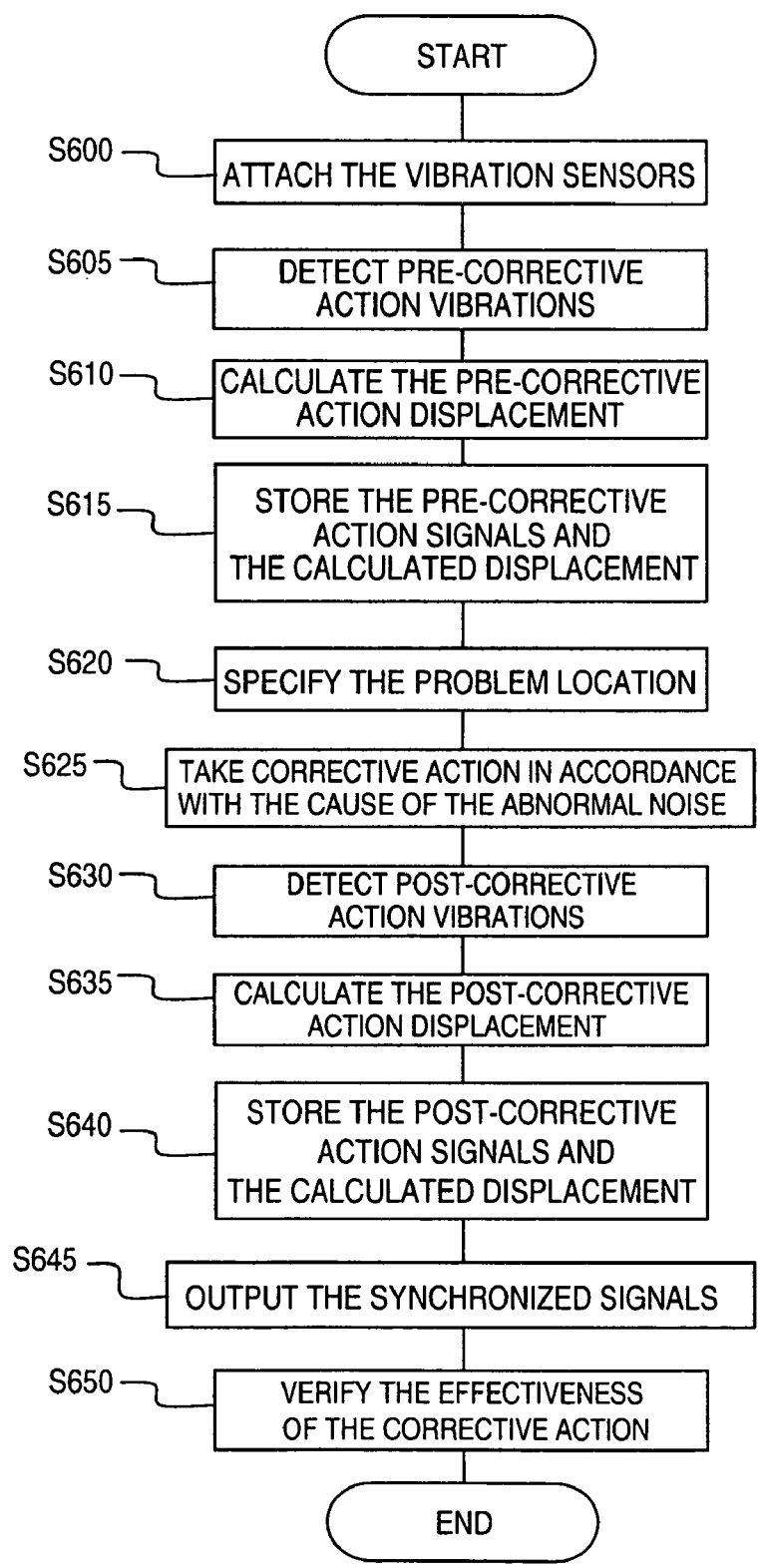
FIG. 13 is an operational flow chart of the operations executed by the abnormal noise correction verification apparatus in accordance with the second embodiment of the present invention.

Referring now to FIGS. 12 and 13, an abnormal noise correction verification apparatus 200 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 12 is a schematic block diagram of the abnormal noise correction verification apparatus 200 in accordance with the second embodiment of the present invention. FIG. 13 is an operational flow chart of the abnormal noise correction verification apparatus 200 shown in FIG. 12, which corresponds to the procedure of the corrective action effectiveness verifying method using the abnormal noise correction verification apparatus 200 according to the second embodiment.

Basically, the second embodiment only differs from the first embodiment in that a displacement detection unit 28 has been provided as part of the personal computer 22. In other words, the second embodiment is identical to the first embodiment, except for the programming of the personal computer 22. Thus, FIG. 12 is identical to FIG. 9, except for the addition of the displacement detection unit 28 in the personal computer 22 of FIG. 12.

In addition, the abnormal noise correction verification apparatus 200 in accordance with a second embodiment will be explained with reference to the usage condition shown in FIG. 8, which is for a case of searching for abnormal vibrations in a rear suspension. Thus, the explanatory diagram shown in FIG. 11, which relates to the output of the synchronized signals, also applies to the abnormal noise correction verification apparatus 200 and its abnormal noise correction verifying method.

The displacement detection unit 28 detects the displacement of the vehicle in the vertical direction on the prescribed route, and functions as a displacement detecting component. The displacement detection unit 28 functions as a displacement calculating component that calculates the displacement of an inspection target object in the vertical direction based on, for example, an integration calculation program that calculates displacement based on an acceleration signal.

The displacement detected by the displacement detection unit 28 is associated, for each of the vibration sensors 10a-10c, with the signal detected from the respective inspection target objects, and then stored in the pre-corrective action signal storage unit 25 (or the post-corrective action signal storage unit 26).

Furthermore, the first embodiment discussed above explained an example wherein the signal (normally meaning the acceleration signal) outputted from the vibration sensor 10d is used as a trigger to output the synchronized signals without any manipulation of the signal (normally meaning the acceleration signal). However, with this embodiment, the displacement of the inspection target object 21d in the vertical direction is calculated based on the signal outputted from the vibration sensor 10d, and that calculated displacement is used as a trigger to output the synchronized signals.

The following explains the details of the corrective action effectiveness verifying method of the abnormal noise correction verification apparatus 200 according to the second embodiment of the present invention, referencing FIG. 13. FIG. 13 is a flow chart that depicts the process details of the abnormal noise correction verification apparatus 200 according to the present embodiment, and the process details of FIG. 13 that are identical to those shown in FIG. 10 are omitted in order to avoid redundancy.

As shown in FIG. 13, first, the vibration sensors 10a to 10d are attached to the inspection target objects 29a to 29d, respectively (step S600).

Next, if the vehicle is caused to travel along the prescribed route and the power supply switch 39 is turned on, the vibrations that are generated by the inspection target objects 20a to 20d are detected by the vibration sensors 10a to 10d (step S605). Those detected vibrations are then converted to electrical signals and sent to the personal computer 22 via the main abnormal noise investigation unit 110. Furthermore, in the present process details, when the vehicle travels along the abovementioned prescribed route, it is preferable for the road surface to have at least one uneven portion at which the displacement of the vehicle in the vertical direction is extremely large during the investigation time.

For example, if the vehicle is caused to travel along the prescribed route, as shown in FIG. 11, then the vehicle passes the location P1, which has an uneven portion that greatly displaces the vehicle in the vertical direction, which immediately starts the synchronized signals output range of the investigation. Then after the vehicle passes the location P2, which has an uneven portion that greatly displaces the vehicle in the vertical direction, immediately ends the synchronized signals output range of the investigation. Although the details are discussed later, the displacements of the inspection target object 21d in the vertical direction, which were calculated based on the signal outputted from the vibration sensor 10d when the vehicle passed the abovementioned uneven portions, serves as triggers for synchronizing and outputting the signal stored in the pre-corrective action signal storage unit 25 and the signal stored in the post-corrective action signal storage unit 26.

Next, the personal computer 22 (displacement detection unit 28) calculates the displacement of the inspection target object 21d in the vertical direction based on the part of the signal received via the main abnormal noise investigation unit 110 that was outputted from the vibration sensor 10d (step S610). The present embodiment explains an example wherein the signal inputted to the displacement calculation unit 28 is the signal (vibrations detected by the inspection target object 21d) outputted from the vibration sensor 10d that correspond to the topology of the road surface on which the vehicle is advancing when traveling on the prescribed route. Accordingly, the displacement detection unit 28 calculates the displacement based on the signal outputted from the vibration sensor 10d.

Next, the personal computer 22 stores, in a time series, the signals sent via the main abnormal noise investigation unit 110, i.e., the signals outputted from the vibration sensors 10a to 10d associated with vibrations detected by the vibration sensors 10a to 10d, and the displacement calculated in the process of step S620 (step S615). At this time, the signals outputted from the vibration sensors 10a to 10d and the displacement calculated in the process of step S620 are associated and stored in the pre-corrective action signal storage unit 25.

Next, the presence of a problem, i.e., the problem location, is specified (step S620) in the manner as described above with reference to steps S320 to S370 of FIG. 3 and steps S420 to S470 of FIG. 6. The method of specifying the problem location was previously explained, and the explanation of the processes will not be repeated.

Next, corrective action is taken with respect to the problem location in accordance with the cause of abnormal noise (step S625).

Next, the vehicle is once again caused to travel the identical travel pattern along the identical route before taking corrective action, and the vibrations of the inspection target objects 29a to 29d after corrective action are detected (step S630). With the present process details, the vibrations after corrective action are detected by executing a process that is substantially the same as that of steps S600 to S605.

Next, the personal computer 22 (displacement detection unit 28) calculates the displacement of the inspection target object 21d in the vertical direction based on the part of the signal sent via the main abnormal noise investigation unit 110 that was outputted from the vibration sensor 10d attendant with the vibrations detected by the vibration sensor 10d (step S635).

Now, the personal computer 22 stores, in a time series, the signals outputted from the main abnormal noise investigation unit 110, i.e., the signals outputted from the vibration sensors 10a to 10d attendant with the vibrations detected by the vibration sensors 10a to 10d, and the displacement calculated in the process of step S620 (step S640). At this time, the signals that are outputted from the vibration sensors 10a to 10d are associated with the signals outputted from the vibration sensors 10a to 10d and the displacement calculated in the process of step S620, and then stored in the pre-corrective action signal storage unit 25.

Next, the operator inputs, to the input apparatus 24, instruction information to output the signals stored in the pre-corrective action signal storage unit 25 and the signals stored in the post-corrective action signal storage unit 26. Furthermore, based on the abovementioned instruction information, the synchronized signals output unit 27 synchronizes and outputs the signals stored in the pre-corrective action signal storage unit 25 and the signals stored in the post-corrective action signal storage unit 26 (step S645).

The following is a detailed explanation of the processes for synchronizing and outputting the signals stored in the pre-corrective action signal storage unit 25 and the signals stored in the post-corrective action signal storage unit 26.

The signal of the vibration sensor 10d that is stored in the pre-corrective action signal storage unit 25 and the signal of the vibration sensor 10d that is stored in the post-corrective action signal storage unit 26 each have two displacements that are calculated based on the high vibration levels that are detected by the passage of the vehicle over the locations P1 and P2 (refer to FIG. 11), which have the abovementioned road surface uneven portions, as explained by the process of step S605. These two high displacement levels function as triggers to synchronize and output the signal stored in the pre-corrective action signal storage unit 25 and the signal stored, in a time series, in the post-corrective action signal storage unit 26.

Specifically, using the point in time when the level of vibrations that are detected by the vibration sensor 10d initially reach (or exceed) a prescribed displacement level as a first trigger (the signal detected when the vehicle passes the location P1, which has an uneven portion, is set as the first trigger) and using the point in time when the level of displacement detected by the vibration sensor 10d next reach (or exceed) the prescribed vibration level as a second trigger (the signal detected when the vehicle passes the location P2, which has an uneven portion, is set as the second trigger), the parts of the signal of the vibration sensor 10c (the vibration sensor that is attached to the problem location) that is stored in the pre-corrective action signal storage unit 25 and the displacement calculated by the displacement detection unit 28 that is stored in the post-corrective action signal storage unit 26 are extracted and output. Specifically, the signals that are detected in the synchronized signals output range, which is shown in FIG. 11, are outputted.

As a result, it is possible to synchronize and output the signal that is stored in the pre-corrective action signal storage unit 25 and that was detected within a specified range of the specified route with the signal that is stored in the post-corrective action signal storage unit 26 and that was detected within the identical specified range. As was previously explained, the present invention can also be configured so that the synchronized signals, which are output from the synchronized signals output unit 27, are output as sound waves using a sound wave output apparatus (not shown), such as speakers, or, by electrically connecting the sensor connection terminals 37a to 37d and the personal computer 22, the synchronized signals outputted from the personal computer 22 are outputted from the headphones 21 via the main abnormal noise investigation unit 110.

Next, based on the signals outputted from the synchronized signals output unit 27, the operator verifies the extent to which the corrective action taken was effective by comparing the signal detected before corrective action and the signal detected after corrective action (step S650), whereupon the process ends.

Figure 14:
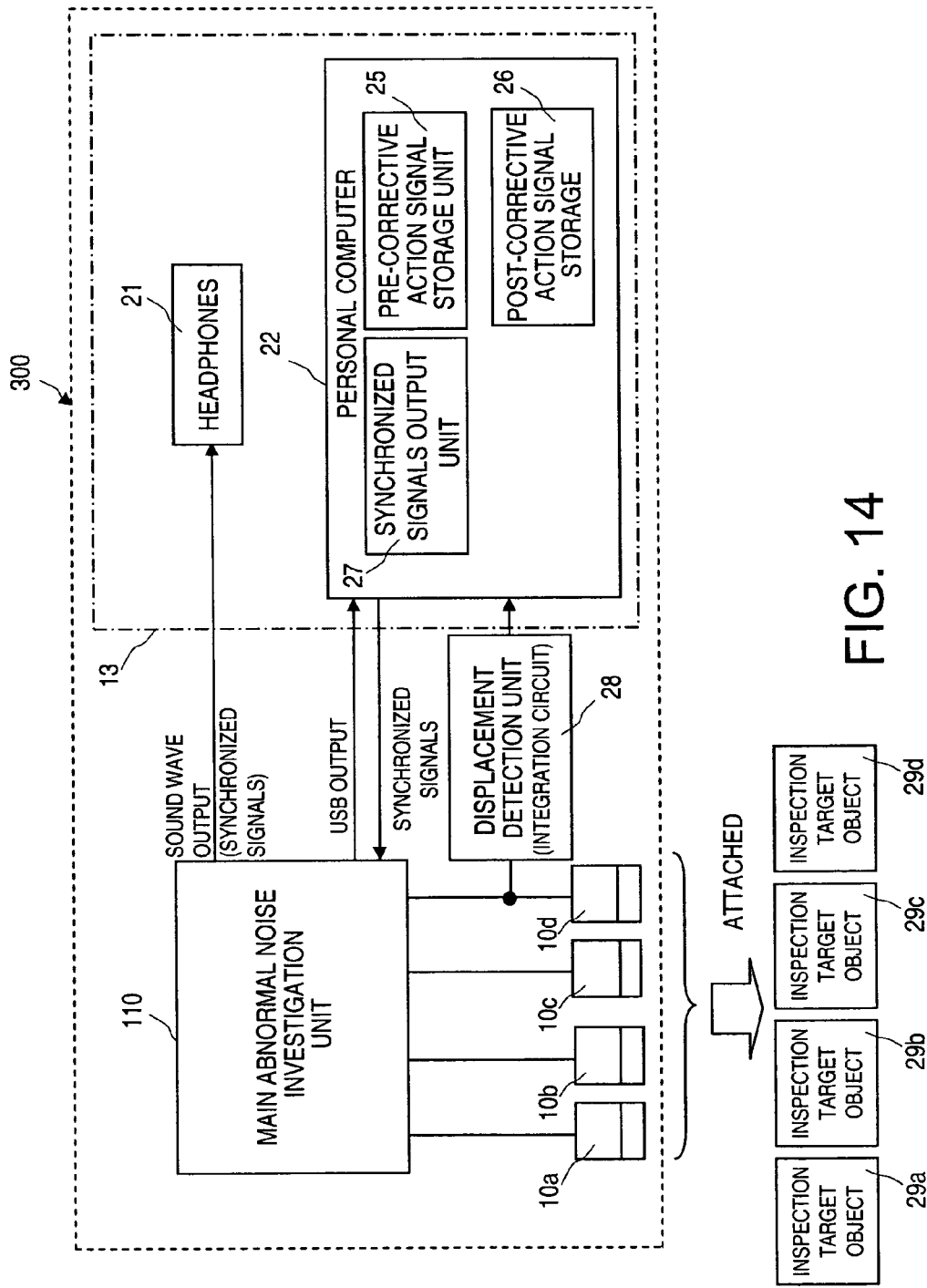
FIG. 14 is a schematic block diagram of the abnormal noise correction verification apparatus in accordance with a third embodiment of the present invention.
Figure 15:
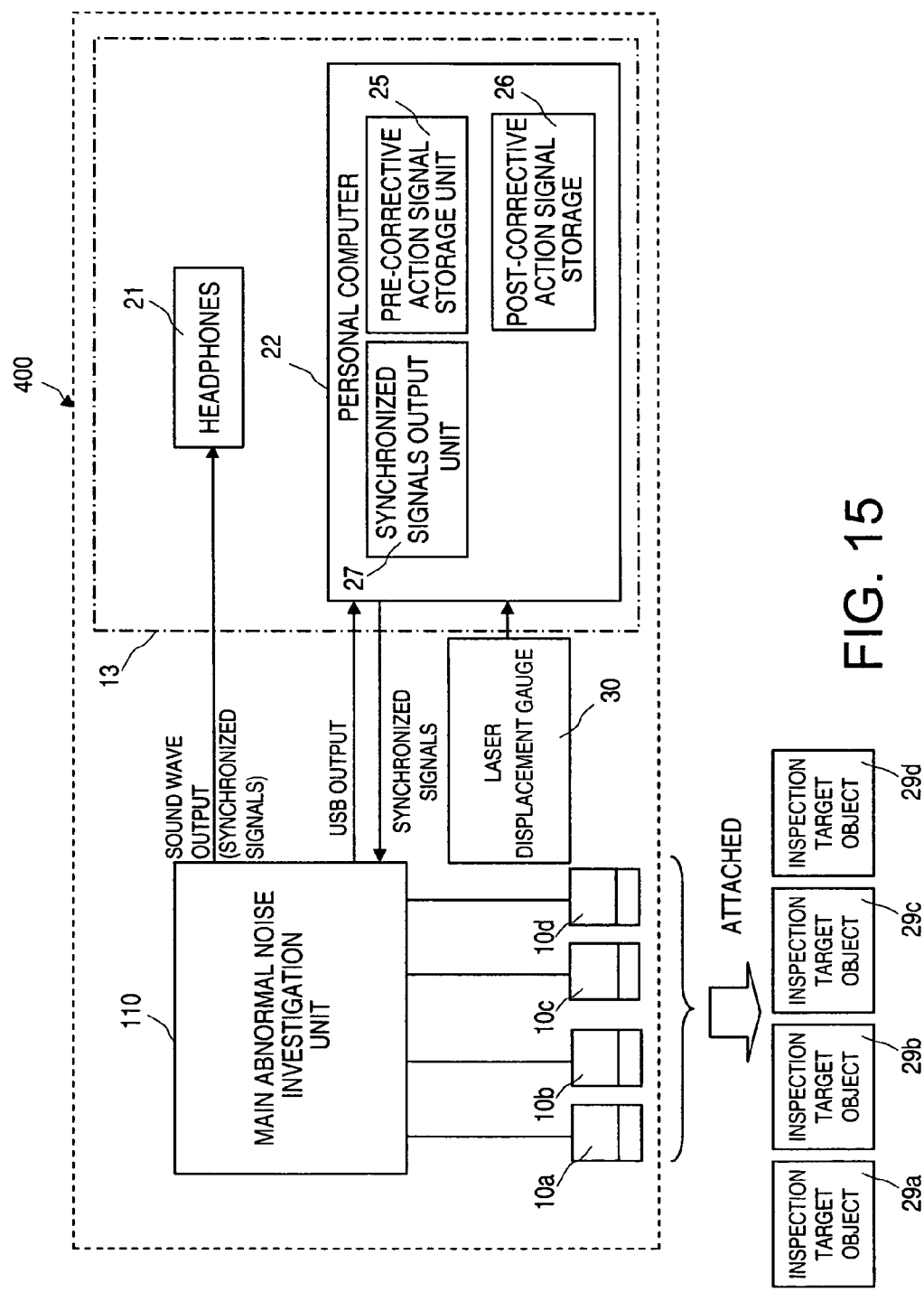
FIG. 15 is a schematic block diagram of the abnormal noise correction verification apparatus in accordance with a fourth embodiment of the present invention.

Furthermore, the above process details were explained as exemplified by a case wherein the displacement detection unit 28 is provided to the personal computer 22, but the present invention is not limited thereto. As shown in FIG. 14, the topology of the road surface of the route on which the vehicle is traveling may be directly detected by using, for example, a displacement detection unit 28, which includes the integration circuit device. Alternatively, as shown in FIG. 15, the topology of the road surface of the route on which the vehicle is traveling may be directly detected by using, for example, a laser displacement gauge 30 that has a function the same as the displacement detection unit 28, and a prescribed displacement level that is detected by the laser displacement gauge may serve as the trigger for outputting the synchronized signals. The first embodiment and the second embodiment explained aspects wherein abnormal noise corrective action was verified by actually causing a vehicle to travel, but vehicle vibrations may be acquired by operating the vehicle under virtual travel conditions, such as by a chassis dynamo, and the vibrations before and after taking corrective action may thereby be compared under the identical travel conditions.

Referring now to FIGS. 14 and 15, an abnormal noise correction verification apparatus 300 in accordance with a third embodiment and an abnormal noise correction verification apparatus 400 in accordance with a fourth embodiment will now be explained. In view of the similarity between these embodiments and the prior embodiments, the parts of these embodiments that are identical to the parts of the prior embodiments will be given the same reference numerals as the parts of the prior embodiments. Moreover, the descriptions of the parts of these embodiments that are identical to the parts of the prior embodiments may be omitted for the sake of brevity.

The second embodiment explained a case wherein the displacement detection unit 28 is part of the personal computer 22. However, the present invention is not limited thereto. Rather, the displacement detection unit 28 can include an integration circuit device (a device that can calculate the displacement based on the acceleration signal) that is detachably connected between the vibration sensor 10d and the main abnormal noise investigation unit 110, and outputs the transformed signals to the personal computer 22 as shown in FIG. 14. In this case, the displacement of the inspection target object 29d in the vertical direction is calculated by directly detecting the signal outputted from the vibration sensor 10d.

In addition, the topology of the road surface of the route on which the vehicle is traveling can also be directly detected by using, for example, a laser displacement gauge 30, which has a function that is the same as the displacement detection unit 28 as seen in the abnormal noise correction verification apparatus 400 shown in FIG. 15. If the laser displacement gauge 30 is used, then it is preferable to detect the topology of the road surface by affixing the laser displacement gauge to, for example, the front of the vehicle, the rear bumper, or the side of the body.

In addition, aspects were explained wherein the displacement of the vehicle in the vertical direction was acquired and used as the trigger to synchronize and output signals stored in the pre-corrective action signal storage unit 25 and signals stored in the post-corrective action signal storage unit 26, but the signals before and after taking corrective action may be synchronized by using a fixed vehicle speed or a fixed engine rotational speed as the trigger.

With the abnormal noise correction verification apparatus and the investigating method thereof according to the above embodiments as described above, it is possible to select the signals of a plurality of desired vibration sensors from a plurality of vibration sensors and to separately output the selected signals from separate outputting component, and it is also possible to compare the signals of vibration sensors that were detected before taking corrective action for a cause of abnormal noise and the signals of vibration sensors that were detected after taking corrective action to eliminate the cause of abnormal noise. As a result, the specification of the problem location is simplified, and, after taking action to correct the cause of abnormal noise, it is possible to easily verify the effectiveness of that corrective action; therefore, the investigation time is markedly reduced, investigation efficiency is improved, and it is possible to significantly improve the working efficiency of corrective action taken with respect to the problem location.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "component" "part," "section," "portion," "member" or "element" when used in the singular can have the dual meaning of a single part or a plurality of parts. Also as used herein to describe the above embodiments, the following directional terms "forward, rearward, above, below, vertical, horizontal, and transverse" as well as any other similar directional terms refer to those directions of a vehicle. Accordingly, these terms, as utilized to describe the present invention should be interpreted relative to a vehicle. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims.

What is claimed is:

1. An abnormal noise correction verification apparatus comprising:
    a vibration sensor configured to detect vibrations of a vehicle;
    a signal extracting component configured to extract a signal in a specific frequency band of the vibrations detected from the vibration sensor;
    a signal storing component configured to store the signal extracted from the vibration sensor; and
    an outputting component configured to synchronize and separately output a pre-corrective action signal from the signal storing component, which is from before eliminating a cause of abnormal noise, and a post-corrective action signal, which is from after eliminating the cause of abnormal noise, in which both signals were detected under identical travel conditions by the vibration sensor.

2. The abnormal noise correction verification apparatus as recited in claim 1, wherein
    the outputting component is configured to output the post-corrective action signal from the signal storing component.

3. The abnormal noise correction verification apparatus as recited in claim 1, wherein
    the outputting component is configured to output the post-corrective action signal from the signal extracting component.

4. The abnormal noise correction verification apparatus as recited in claim 1, further comprising
    a displacement component configured to detect vertical displacements of the vehicle, with the outputting component using one of the displacements detected by the displacement component that has a prescribed magnitude as a reference to synchronize the pre-corrective action signal and the post-corrective action signal.

5. The abnormal noise correction verification apparatus as recited in claim 4, wherein
    the displacement component is configured to calculate the vertical displacements of the vehicle based on a signal outputted from the vibration sensor.

6. The abnormal noise correction verification apparatus as recited in claim 5, wherein
    the vibration sensor is configured to temporarily and freely be attached to and detached from a desired location of the vehicle during inspection.

7. The abnormal noise correction verification apparatus as recited in claim 5, wherein
    the outputting component includes a sound wave outputting device that separately outputs, as sound waves, the signals selected by a signal selecting component.

8. The abnormal noise correction verification apparatus as recited in claim 4, wherein
    the displacement component includes a laser displacement gauge configured to detect the vertical displacements of the vehicle.

9. The abnormal noise correction verification apparatus as recited in claim 8, wherein
    the vibration sensor is configured to temporarily and freely be attached to and detached from a desired location of the vehicle during inspection.

10. The abnormal noise correction verification apparatus as recited in claim 8, wherein
    the outputting component includes a sound wave outputting device that separately outputs, as sound waves, the signals selected by a signal selecting component.

11. The abnormal noise correction verification apparatus as recited in claim 4, wherein
    the vibration sensor is configured to temporarily and freely be attached to and detached from a desired location of the vehicle during inspection.

12. The abnormal noise correction verification apparatus as recited in claim 4, wherein
    the outputting component includes a sound wave outputting device that separately outputs, as sound waves, the signals selected by a signal selecting component.

13. The abnormal noise correction verification apparatus as recited in claim 1, wherein
    the vibration sensor is configured to temporarily and freely be attached to and detached from a desired location of the vehicle during inspection.

14. The abnormal noise correction verification apparatus as recited in claim 13, wherein
    the outputting component includes a sound wave outputting device that separately outputs, as sound waves, the signals selected by a signal selecting component.

15. The abnormal noise correction verification apparatus as recited in claim 1, wherein
    the outputting component includes a sound wave outputting device that separately outputs, as sound waves, the signals selected by a signal selecting component.

16. An abnormal noise correction verification apparatus comprising:
    vibration sensing means for detecting vibrations of a vehicle;
    signal extracting means for extracting a signal in a specific frequency band of the vibrations detected from the vibration sensing means;
    signal storing means for storing the signal extracted from the vibration sensing means; and
    outputting means for synchronizing and separately outputting a pre-corrective action signal from the signal storing means, which is from before eliminating a cause of abnormal noise, and a post-corrective action signal, which is from after eliminating the cause of abnormal noise, in which both signals were detected under identical travel conditions by the vibration sensing means.

17. An abnormal noise correction verifying method comprising:
    operating a vehicle under specified travel conditions;
    detecting vibrations of the vehicle during operation of the vehicle by using a vibration sensor that is attached to the vehicle;

storing the vibrations detected by the vibration sensor during operation of the vehicle under the specified travel conditions as a pre-corrective action signal;

investigating, based on the detected vibrations, whether the vehicle has an abnormal noise and a cause of the abnormal noise;

performing a corrective action on the vehicle to eliminate the cause of the abnormal noise;

operating the vehicle again under the specified travel conditions, after the corrective action was performed;

detecting vibrations of the vehicle during operation of the vehicle after the corrective action was performed as a post-corrective action signal; and synchronizing and separately outputting the pre-corrective action signal and the post-corrective action signal.

18. The abnormal noise correction verifying method as recited in claim 17, further comprising detecting a vertical displacement of the vehicle under the specified travel conditions before the corrective action was performed;

storing the vertical displacement that was detected before the corrective action was performed;

detecting the vertical displacement of the vehicle under the specified travel conditions after the corrective action was performed; and using the vertical displacements that were detected having a prescribed magnitude as a reference to synchronize the pre-corrective action signal and the post-corrective action signal.

* * * * *